United States Patent
Clow et al.

(10) Patent No.: US 7,634,738 B2
(45) Date of Patent: Dec. 15, 2009

(54) SYSTEMS AND METHODS FOR PROCESSING INPUT DATA BEFORE, DURING, AND/OR AFTER AN INPUT FOCUS CHANGE EVENT

(75) Inventors: Josh A. Clow, Bellevue, WA (US); Adrian J. Garside, Sammamish, WA (US); David V. Winkler, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 616 days.

(21) Appl. No.: 10/992,092

(22) Filed: Nov. 19, 2004

(65) Prior Publication Data

US 2006/0123159 A1  Jun. 8, 2006

(51) Int. Cl.
*G06F 3/048* (2006.01)
(52) U.S. Cl. .................. 715/802; 715/767; 719/318
(58) Field of Classification Search ............. 710/748, 710/758; 715/767, 802; 719/318
See application file for complete search history.

(56) References Cited

U.S. PATENT DOCUMENTS

| | | | | |
|---|---|---|---|---|
| 5,430,836 A * | 7/1995 | Wolf et al. | .................. | 715/744 |
| 5,721,849 A * | 2/1998 | Amro | ........................ | 715/802 |
| 5,802,318 A * | 9/1998 | Murray et al. | .............. | 710/100 |
| 5,875,311 A * | 2/1999 | Bertram et al. | ............. | 710/305 |
| 6,219,727 B1 * | 4/2001 | Kailash et al. | ................ | 710/48 |
| 6,523,073 B1 * | 2/2003 | Kammer et al. | ............... | 710/48 |
| 7,100,169 B2 * | 8/2006 | Carney et al. | ............... | 719/321 |
| 7,111,090 B1 * | 9/2006 | Lemke et al. | ................. | 710/48 |
| 7,187,801 B2 * | 3/2007 | Pettiross et al. | ............. | 382/187 |
| 7,200,695 B2 * | 4/2007 | Rosner | ........................ | 710/52 |
| 2001/0011308 A1 * | 8/2001 | Clark et al. | ................... | 710/20 |
| 2002/0065964 A1 * | 5/2002 | Lemke et al. | ................. | 710/48 |
| 2002/0089547 A1 * | 7/2002 | Huapaya | ..................... | 345/802 |
| 2003/0210270 A1 * | 11/2003 | Clow et al. | .................. | 345/767 |
| 2005/0086401 A1 * | 4/2005 | Connor | ........................ | 710/48 |
| 2005/0228920 A1 * | 10/2005 | Shah et al. | ................... | 710/267 |
| 2005/0273529 A1 * | 12/2005 | Young et al. | .................. | 710/58 |
| 2006/0005142 A1 * | 1/2006 | Karstens | ..................... | 715/767 |

* cited by examiner

*Primary Examiner*—Ting Zhou
*Assistant Examiner*—Ashraf Zahr
(74) *Attorney, Agent, or Firm*—Shook Hardy & Bacon, LLP

(57) ABSTRACT

Systems, methods, and computer-readable media process computer input data (such as electronic ink data, speech input data, keyboard input data, etc.), including focus change data, in a manner so that the input insertion range better comports with the user's original intent. More specifically, user input data may be accepted, before, during, and/or after a focus change event is initiated, and the systems and methods will process this input data in an intuitive manner, directing the data to areas of an application program or the operating system that better comport with the user's original intent. In this manner, loss of input data may be avoided and misdirected input data may be avoided, thereby lowering user frustration during focus change events.

59 Claims, 17 Drawing Sheets

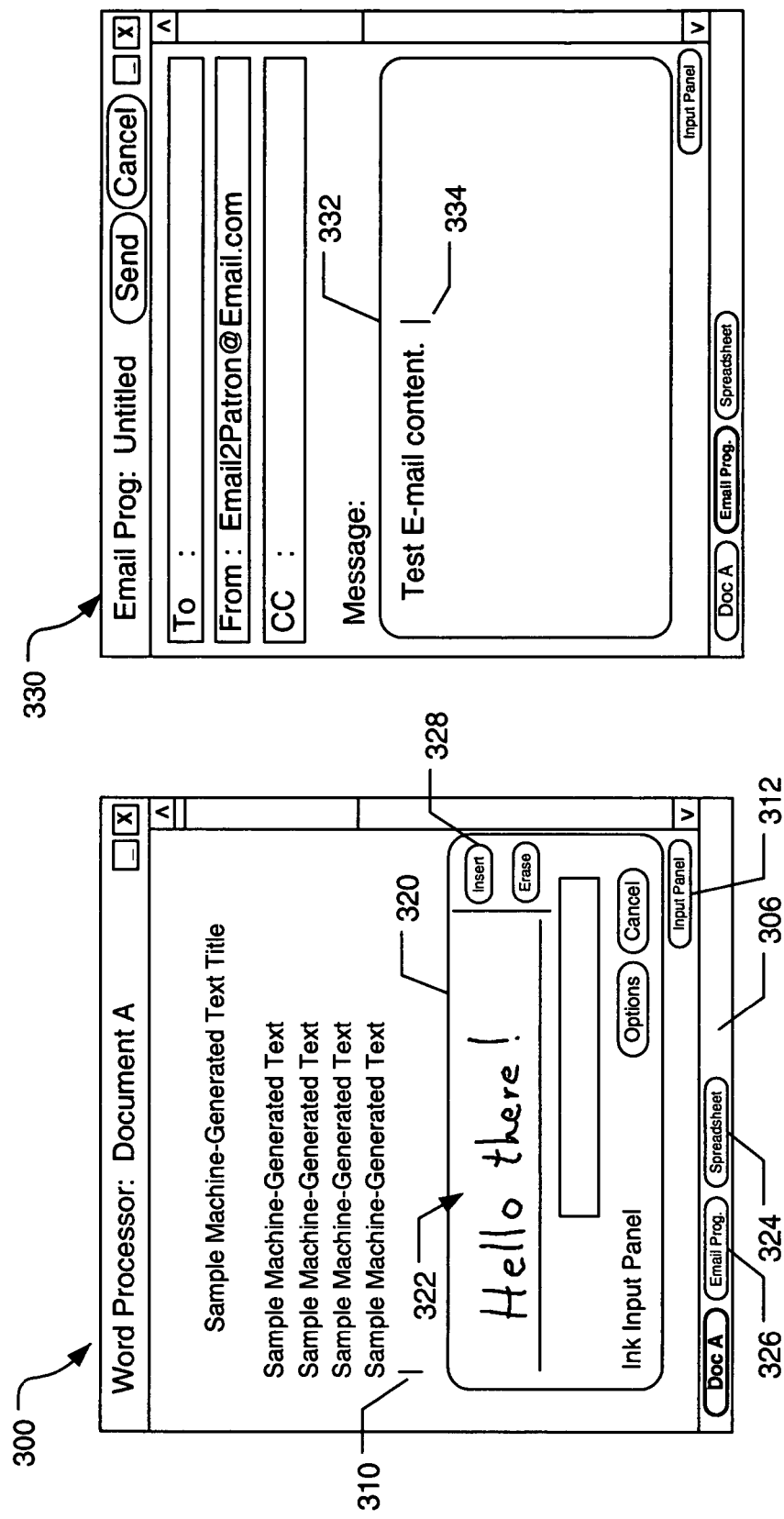

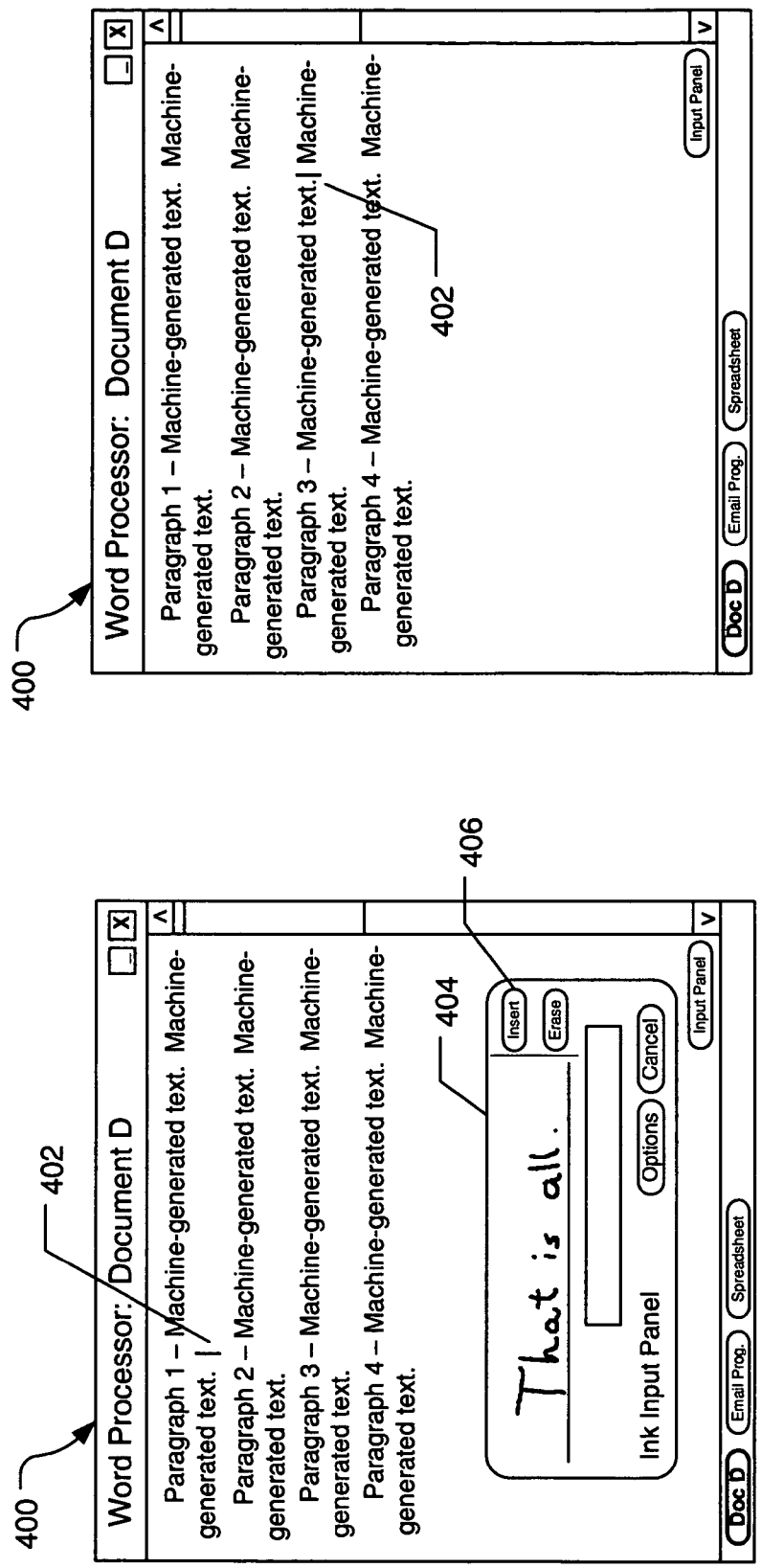

Fig. 5C

Form: Document A
Name: John Q. Public
Address: 111 Any Street
City: Any Town — 510
State:
Telephone:

Form: Document A
Name: John Q. Public
Address: 111 Any Street
City: Any Town
State: x
Telephone: — 502

Form: Document A
Name: John Q. Public
Address: 111 Any Street
City: Any
State: Town M| Zip:
Telephone:

Form: Document A
Name: John Q. Public
Address: 111 Any Street
City:
State: M Any Town |Zip: — 512
Telephone:

500

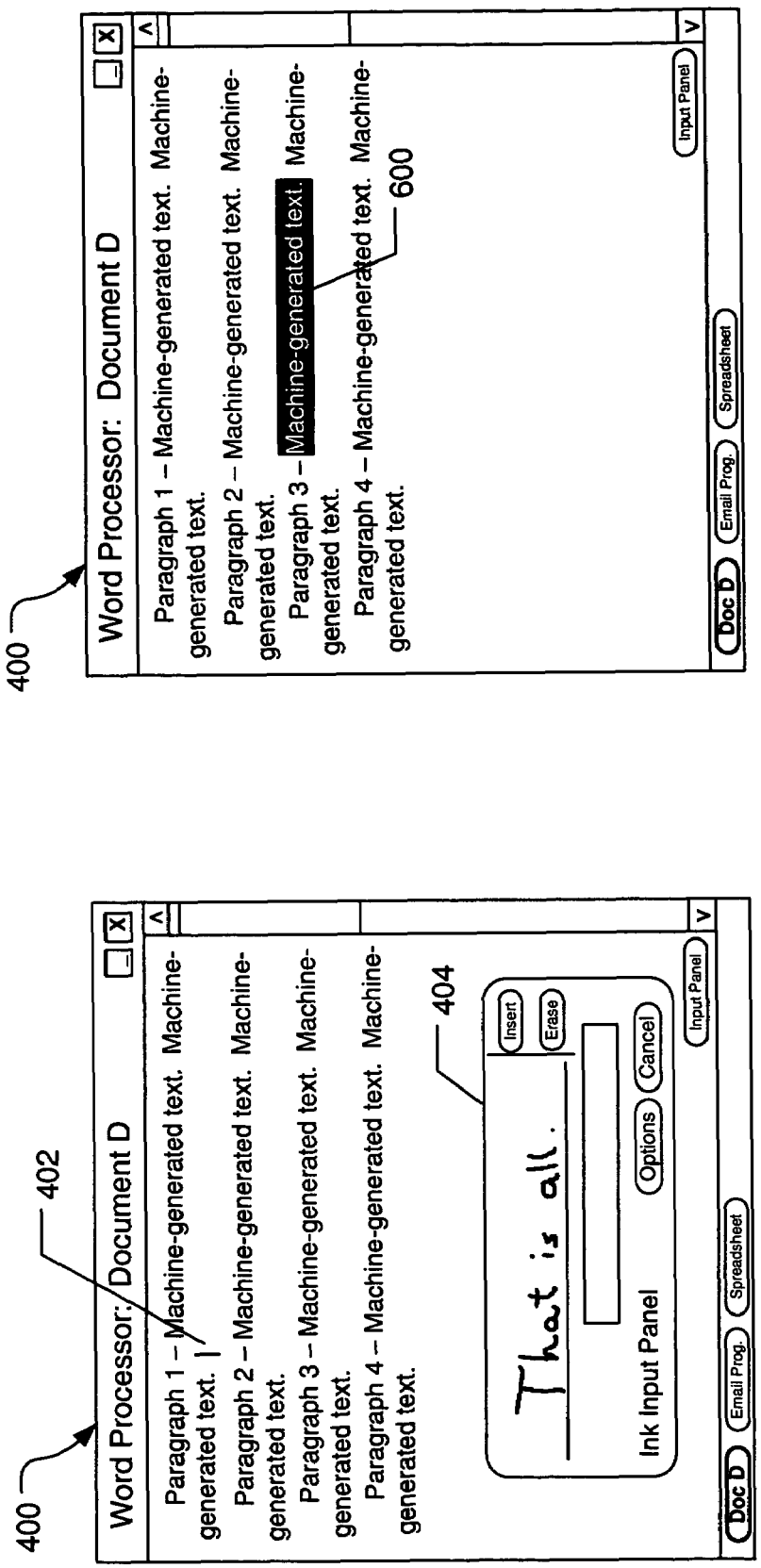

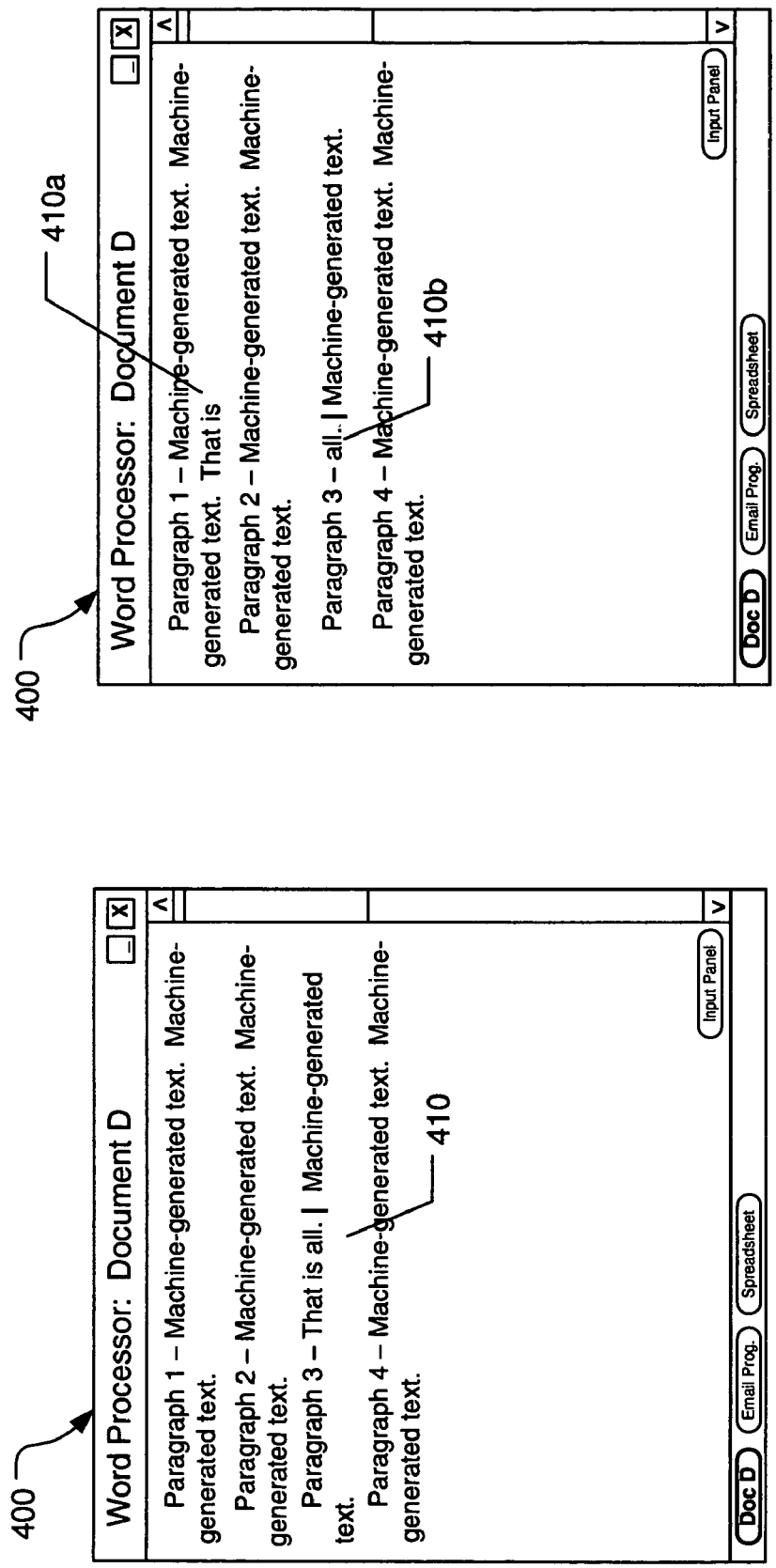

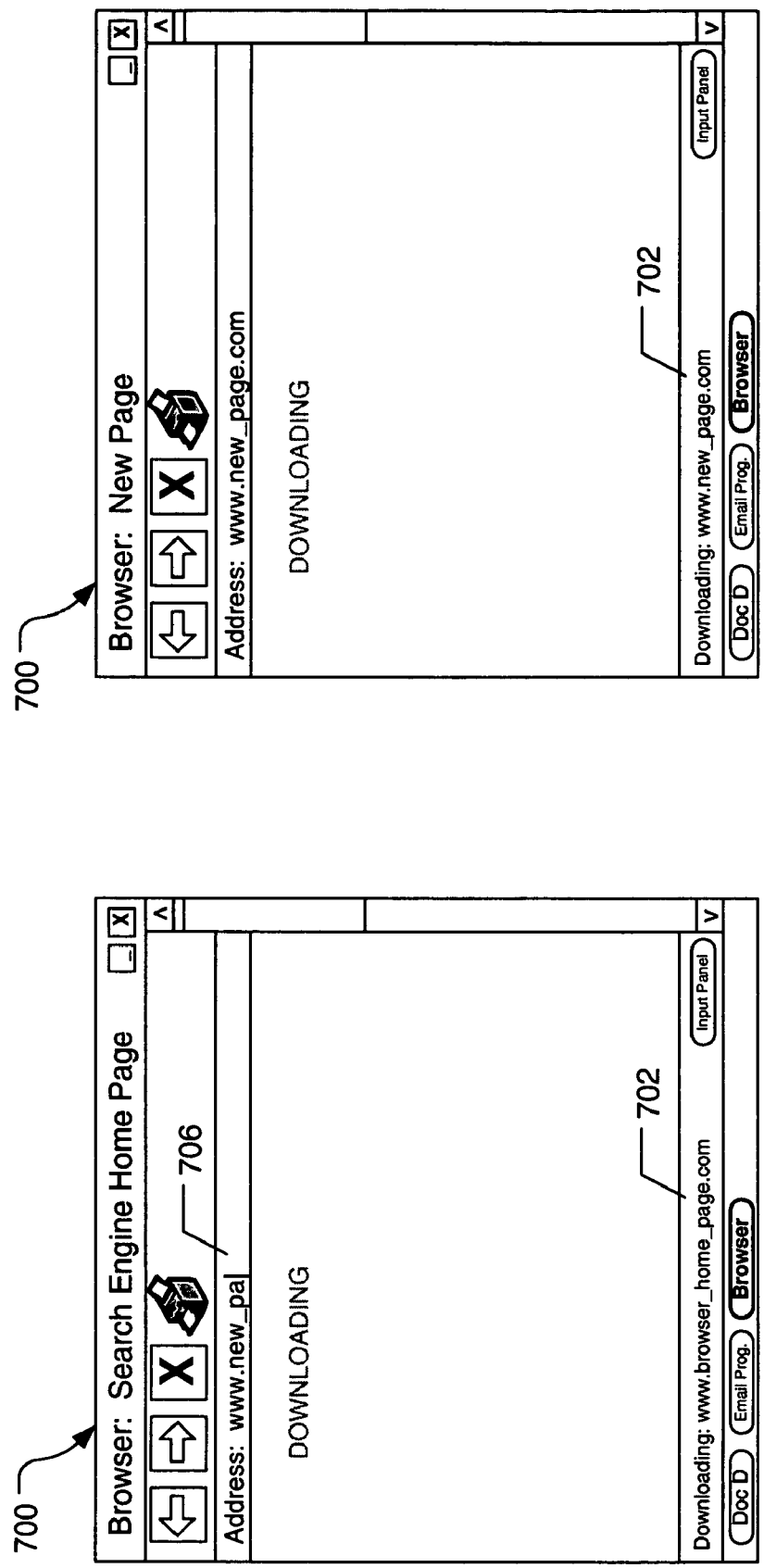

SYSTEMS AND METHODS FOR PROCESSING INPUT DATA BEFORE, DURING, AND/OR AFTER AN INPUT FOCUS CHANGE EVENT

FIELD OF THE INVENTION

The present invention generally relates to systems, methods, and computer-readable media for processing computer input data (such as electronic ink data, speech input data, keyboard input data, mouse input data, or the like) before, during, and/or after a focus change event. Such systems and methods will process the incoming data such that the input is inserted into the desired application program in a manner that better comports with the user's original intent.

BACKGROUND

Typical computer systems, especially computer systems using graphical user interfaces ("GUIs"), are optimized for accepting user input from one or more discrete input devices, such as a keyboard for entering text and a pointing device, such as a mouse with one or more buttons, for operating the user interface. An example of such a GUI is the user interface for the Windows® computer operating system (available from Microsoft Corporation of Redmond, Wash.). The ubiquitous keyboard and mouse interface provides for fast creation and modification of documents, spreadsheets, database fields, drawings, photos, web pages, emails, and the like.

Recently, however, pen-based computing systems, such as tablet personal computers ("tablet PCs"), personal digital assistants ("PDAs"), and the like, have been increasing in popularity. With pen-based computing systems, user input advantageously may be introduced as "electronic ink" using an electronic "pen" or stylus (e.g., mimicking writing with a pen or pencil on a piece of paper). Indeed, in at least some pen-based computing systems, all user input is capable of being entered and manipulated using an electronic pen input device, and the user interface is fully controllable using only the electronic pen.

As pen-based computing systems become more popular, users are increasingly entering more data in the form of electronic ink. In many instances, users may wish to convert the original electronic ink data to machine-generated text, e.g., text suitable for use and manipulation by conventional word processing programs, spreadsheet programs, email programs, document management programs, web browsers, etc. While handwriting recognition technology for converting handwritten electronic ink text to machine-generated text has improved in recent years, recognizers of this type, in at least some instances, still may be relatively slow. In some instances, handwriting recognition of newly input electronic ink data still may be taking place when a focus change command is received by the computer system. A focus change may change the active cursor or insertion location in a single application program and/or electronic document, or it may change the active application program and/or electronic document open and available to receive input data. When focus changes occur before handwriting recognition has been completed or while it is ongoing, the recognized text corresponding to the input will be first available only after the focus change occurs, which typically results in the recognized text being inserted at an incorrect or undesired location (e.g., at the new focus location). In some instances, for example when the new focus location is not adapted to receive input, the user input may be lost when the focus changes.

Focus changes, including system-generated focus changes, user-initiated focus changes, inadvertent or unexpected focus changes, and the like, can affect input other than electronic ink input. For example, speech input and/or keyboard input also may be misdirected, mislocated, or lost due to focus changes.

The above-noted issues associated with data input and focus changes in computing systems can lead to user frustration. Accordingly, there is a need in the art for improved input insertion and/or recognition capabilities, particularly surrounding a focus change event, so that user input is correctly directed despite the existence of a focus change.

SUMMARY

Aspects of the present invention relate to systems and methods for processing computer input data (such as electronic ink data, speech input data, keyboard input data, mouse input data, or the like), including focus change data, in a manner so that the input insertion better comports with the user's original intent. More specifically, systems and methods in accordance with examples of this invention will accept input data received before, during, and/or after focus change events, and they will direct the data to areas of an application program, component, or operating system in a manner more likely to conform to the user's original intent. Various different processing steps may take place in accordance with examples of the invention. For example, different processing steps may take place upon under different processing conditions, e.g., depending on whether the intended input data target or recipient application program or component is a "text services framework" (or "TSF") enabled application program or component. Additional aspects of the invention relate to computer-readable media including computer-executable instructions stored thereon for performing various methods and/or operating various systems for processing input data at or near the time of a focus change, including systems and methods like those described above.

In at least some examples, as noted above, aspects of the invention may be practiced on operating systems that provide a "text services framework" (or "TSF"), such as the Windows XP Tablet PC Edition™ operating system available from Microsoft Corporation of Redmond, Wash., which is known to those skilled in the art. As also known to those skilled in the art, a text services framework can associate various metadata with text. For example, if the text were derived from recognized handwritten or speech input data, then that text may have alternate recognition selections associated with it. If an application program or component supports a text services framework, then when the application program or component receives text of this type, it also will receive and maintain any metadata associated with that text.

BRIEF DESCRIPTION OF THE DRAWINGS

The above and other objects, features, and advantages of the present invention will be more readily apparent and more fully understood from the following detailed description, taken in conjunction with the appended drawings, in which:

FIGS. 3A through 3G illustrate examples of issues involved with input data entry when focus changes from one application program to another;

FIGS. 4A through 4E illustrate examples of issues involved with input data entry when focus changes from one range in an application program to another range in the same application program;

FIGS. 5A through 5E illustrate examples of issues involved with input data entry when focus changes from one field in an application program to another field in the application program;

FIGS. 6A through 6D illustrate examples of issues involved with input data entry when focus changes from one insertion point in an application program to a selection in the application program;

FIGS. 7A through 7E illustrate examples of issues involved with keyboard input data entry when focus changes from one range in an application program to another range in the application program;

When the same reference number is used in more than one of the attached drawings, it is intended to refer to the same or similar parts, features, or steps in the various different drawings.

DETAILED DESCRIPTION

Figure 1:
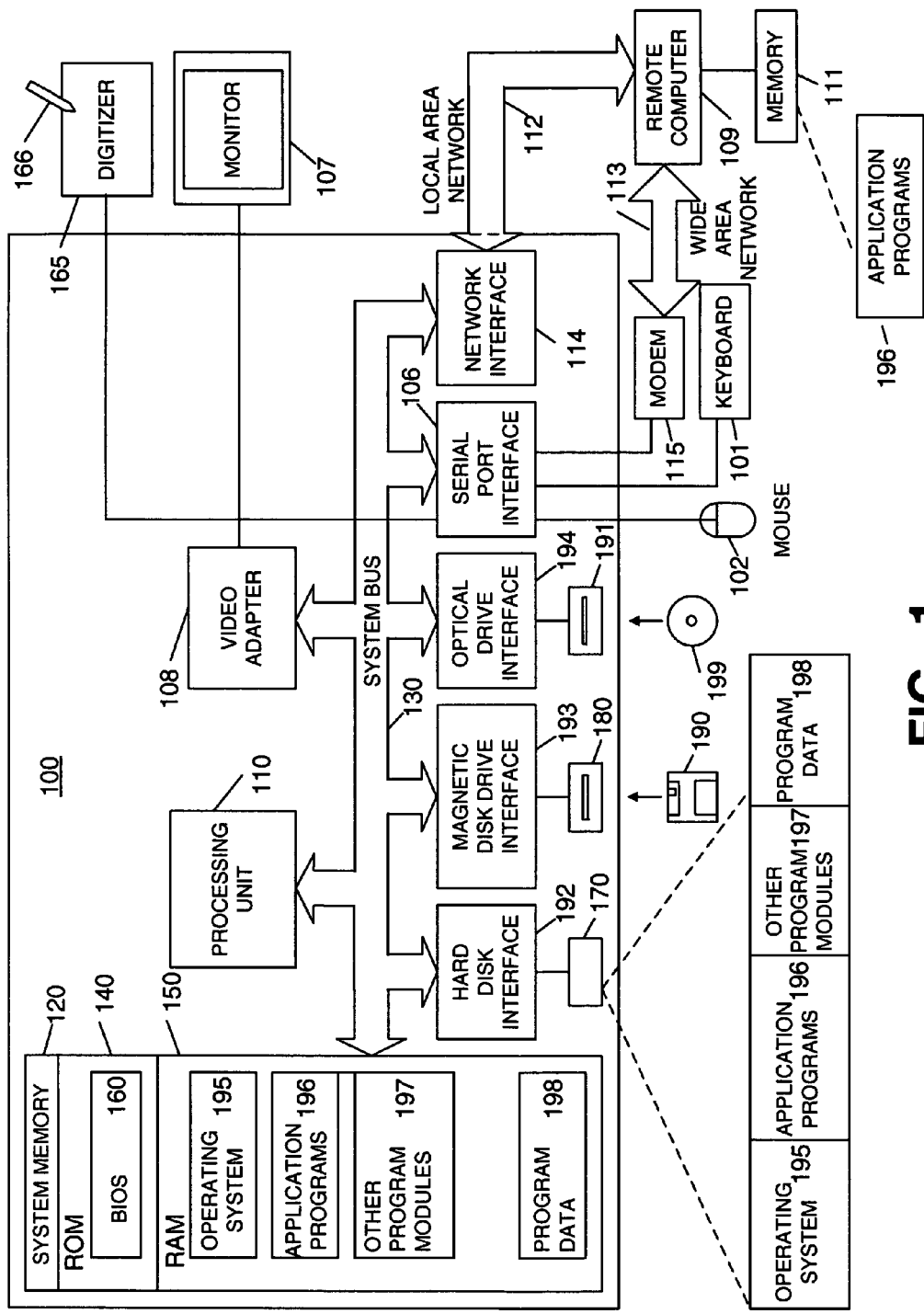
FIG. 1 illustrates a schematic diagram of an example general-purpose digital computing environment in which at least some aspects of the present invention may be implemented.

As described above, aspects of the present invention relate to systems, methods, and computer-readable media for processing input data received at or near a focus change event. The following description is divided into sub-sections to assist the reader. The sub-sections include: Terms; General Description of Various Aspects of the Invention; Example Hardware; Example Systems, Methods, and Computer-Readable Media According to the Invention; and Conclusion.

I. Terms

The following terms are used in this specification and, unless otherwise specified or clear from the context, the terms have the meanings provided below:

"Pen"—Any type of user input device useful in entering electronic ink into and/or otherwise manipulating or controlling an electronic document, a user interface, and/or a computer operating system. The terms "pen" and "stylus" may be used interchangeably in this specification.

"Pen-Down Event"—An event that is initiated at the time a pen contacts a digitizer. Typically, a pen-down event will end at the time the pen leaves the digitizer surface (also called a "pen-up event"). Electronic ink data may be collected based on movement of a pen between a pen-down event and a pen-up event, e.g., as an ink stroke or in other conventional manners as are known in the art.

"Range" information, as used in the context of "focus range" or "focus range data," means data of any type or format indicating a location, area, field, selection, insertion point, cursor location, or other locational or positional attribute, etc., in an electronic document, application program, or component associated with the focus. Typically, the "range" having focus in a document, application program, or component is the place actively ready and able to accept input.

"Hover"—Positioning or locating a pen proximate or adjacent to a digitizer surface but not in contact with the surface. No specific time period or cessation of motion at a particular location or position is necessary to constitute a "hover" action, although the pen may remain still during a hover event. As an example, a "hover" event may occur or be recognized during the time period that a user continuously moves a pen toward and into contact with a digitizer surface.

"Computer-Readable Medium" means any available media that can be accessed by a user on a computer system. By way of example, and not limitation, "computer-readable media" may include computer storage media and communication media. "Computer storage media" includes volatile and nonvolatile, removable and non-removable media implemented in any method or technology for storage of information, such as computer-readable instructions, data structures, program modules or other data. "Computer storage media" includes, but is not limited to, RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. "Communication media" typically embodies computer-readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of "computer-readable media."

II. General Description of Various Aspects of the Invention

As generally described above, aspects of the present invention relate to systems, methods, and computer-readable media for processing input data and focus change events in computing systems in a manner that better comports with a user's original intent. Systems, methods, and computer-readable media in accordance with at least some examples of this invention will accept input data received before, during, and/or after focus change events, and they will process this data in a manner so as to direct the input data to the area of an application program, component, or operating system to which the input was originally destined despite the intervening focus change event.

Methods in accordance with at least some examples of this invention may include: (a) receiving data indicating a first range of an application program that has obtained focus; (b) receiving input data including information destined for the first range; (c) creating an input object for receiving the input data; (d) storing data identifying the first range; (e) receiving a change in focus, in at least some instances, after receipt of the input data has started but before insert-data corresponding to the input data is inserted at the first range; (f) sending the insert-data corresponding to the input data to the input object; (g) sending the insert-data and data identifying the first range to the application program; (h) inserting the insert-data at the first range in the application program; and (i) processing the change in focus.

Additional example methods in accordance with aspects of this invention may include: (a) sending data to a manager object indicating a first range of an application program that has obtained focus; (b) receiving input data including information destined for the first range; (c) creating an input object for receiving the input data; (d) associating the input object with the manager object; (e) storing data identifying the first range in the input object; (f) receiving a change in focus, in at least some instances, after receipt of the input data has started but before data corresponding to recognized text associated with the input data is inserted at the first range; (g) recognizing the input data to thereby provide the data corresponding to the recognized text associated with the input data; (h) sending the data corresponding to the recognized text to the input object; (i) sending data corresponding to the recognized text and data identifying the first range from the input object to the manager object; (j) sending data corresponding to the recognized text and data identifying the first range from the manager object to the application program; (k) inserting data corresponding to the recognized text at the first range in the application program; and (l) processing the change in focus.

Some additional, more specific methods in accordance with aspects of this invention may include: (a) notifying a TSF manager object that a first range in a TSF-enabled application program has obtained focus and receiving data at the TSF manager object identifying the first range associated with the focus; (b) receiving ink input data in an ink input area including information destined for the first range; (c) creating an input object for receiving the ink input data from the ink input area; (d) associating the input object with the TSF manager object; (e) storing data identifying the first range associated with the focus in the input object; (f) receiving a change in focus, in at least some instances, after receipt of the ink input data has started but before data corresponding to recognized text associated with the ink input data is inserted at the first range in the TSF-enabled application program; (g) recognizing the ink input data to thereby provide the data corresponding to the recognized text associated with the ink input data; (h) sending the data corresponding to the recognized text to the input object; (i) sending data corresponding to the recognized text and data identifying the first range from the input object to the TSF manager object; (j) sending data corresponding to the recognized text and data identifying the first range from the TSF manager object to the TSF-enabled application program; (k) inserting data corresponding to the recognized text at the first range in the TSF-enabled application program; and (l) processing the change in focus.

Aspects of this invention also may relate to processing focus changes and input data in various different types of application programs or components, and optionally in non-TSF-enabled application programs or components. For example, methods in accordance with at least some examples of this invention may include: (a) receiving data indicating that an application program has obtained focus; (b) determining when a focus change has occurred or is about to occur; (c) when a determination is made that a focus change has occurred or is about to occur, interrupting processing in the application program to prevent the focus change; and (d) while processing is interrupted, determining if at least some data has been input by a user that has not been entered as insert-data into the application program. When at least some such user input data is present, the method further includes: (a) continuing to interrupt processing in the application program until the user input data has been completely entered and the insert-data corresponding to the user input data is available, (b) then sending the insert-data to the application program, and (c) then resuming processing in the application program. When processing resumes, the insert-data will be placed in the application program and the focus change then will be processed by the application program. When it is determined that there is no unentered user input data present when the focus change determination is made, the processing interruption is discontinued, and the method further includes processing the focus change.

Additional example methods in accordance with this aspect of the invention may include: (a) notifying a manager object that an application program has obtained focus; (b) determining when a focus change has occurred or is about to occur; (c) when a determination is made that a focus change has occurred or is about to occur, sending a process blocking call from the application program to the manager object; and (d) when the process blocking call is received at the manager object, determining if an input object is associated with the manager object. When it is determined that an input object is associated with the manager object, the manager object waits to receive data corresponding to recognized text from the input object. When this data is received, the manager object then sends the data corresponding to the recognized text to the application program, and it then returns or responds to the process blocking call, which thereby allows processing to resume in the application program (which then inserts the recognized text data at the focus location and then processes the focus change). When it is determined that no input object is associated with the manager object, the manager object promptly returns or responds to the process blocking call, thereby allowing processing to resume in the application program (which processes the focus change). When it is determined that an input object is associated with the manager object, methods in accordance with at least some examples of the invention further may include one or more of the following additional steps: receiving input data; creating the input object (e.g., when the input data is initially received); associating the input object with the manager object; recognizing the input data to thereby provide data corresponding to recognized text associated with the input data; sending data corresponding to the recognized text to the input object; and/or sending data corresponding to the recognized text from the input object to the manager object.

More detailed examples of aspects of the invention for focus processing in non-TSF-enabled application programs for processing electronic ink data may include, for example: (a) notifying a TSF manager object that an application program has obtained focus (even a non-TSF-enabled application program); (b) determining when a focus change has occurred or is about to occur; (c) when a determination is made that a focus change has occurred or is about to occur, sending a blocking COM call from the application program to the TSF manager object; and (d) when the blocking COM call is received at the TSF manager object, determining if an ink input object is associated with the TSF manager object. When it is determined that an ink input object is associated with the TSF manager object, the TSF manager object waits to receive data corresponding to recognized text from the ink input object (if it has not already received this data) and then sends the data corresponding to the recognized text to the application program. The TSF manager object then returns or responds to the application program's blocking COM call, which allows processing in the application program to resume. When processing resumes, the application program will first insert the recognized text at the focus location and then process the focus change. When it is determined that no ink input object is associated with the TSF manager object, the TSF manager object simply returns or responds to the blocking COM call, which allows the focus change process to continue. When electronic ink data is available for processing when the blocking COM call is received, methods in accordance with this example of the invention further may include one or more of the following additional steps: receiving ink input data in an ink input area; creating the ink input object to receive the ink input data; associating the ink input object with the TSF manager object; creating the ink input object when receipt of ink input data is initially detected; recognizing the ink input data to thereby provide data corresponding to recognized text associated with the ink input data; sending data corresponding to the recognized text to the ink input object; and/or sending data corresponding to the recognized text from the ink input object to the TSF manager object.

Still additional aspects of this invention may relate to methods of processing input data destined for various types of application programs and/or components in an application program. Such methods may include, for example: (a) receiving a first notification that a first application program has obtained focus; (b) receiving input data including information destined for a first range of the first application program with focus; (c) receiving a second notification that a focus change has occurred or is about to occur; (d) after receiving the second notification, determining if data insert to the first application program based on the input data is complete; and (e) when it is determined that the data insert based on the input data is not complete, determining whether focus range data was associated with the first notification. When focus range data was associated with the first notification, the data corresponding to the input data may be inserted at the focus range and the focus change may be processed in any order. When focus range data was not associated with the first notification, however, the focus change will be delayed until after data corresponding to the input data is inserted into the first application program. In at least some example methods according to this aspect of the invention, the second notification identified above may include interrupting processing in the application program. When a determination is made that data insert to the first application program based on the input data is complete, processing in the application program may be resumed, and the focus change may be processed.

More detailed example methods according to this aspect of the invention may include, for example: (a) notifying a manager object when a first application program has obtained focus; (b) notifying the manager object when a focus change has occurred or is about to occur; and (c) when entry of input data had started and not finished when the manager object was notified of the focus change, determining whether focus range data was associated with the notification that the first application program had obtained focus. As described above, when focus range data was associated with the notification that the first application program had obtained focus, methods according to at least some examples of the invention further may include inserting data corresponding to recognized text based on the input data at the focus range and processing the focus change in any order. When focus range data was not associated with the notification that the first application program had obtained focus, methods according to at least some examples of the invention further may include delaying processing of the focus change until after data corresponding to recognized text based on the input data is inserted into the first application program.

In accordance with at least some examples of the invention, the procedure of notifying the manager object when a focus change has or is about to occur may include sending a process blocking call from the first application program to the manager object. In response to this process blocking call, the methods further may include determining whether entry of input data had started and not finished in the first application program (e.g., by determining if an input object is associated with the manager object). When a determination is made that no entry of input data had started and not finished when the process blocking call was received, the process blocking call may be promptly returned or responded to by the manager object, thereby "unblocking" further processing.

Still more detailed example methods according to this aspect of this invention may include, for example: (a) notifying a TSF manager object that a first application program has obtained focus; (b) notifying the TSF manager object when a focus change has occurred or is about to occur; and (c) when entry of ink input data had started and not finished when the TSF manager object was notified of the focus change, methods according to at least some examples of the invention further may include determining whether focus range data was associated with the notification that the first application program had obtained focus. When focus range data was associated with the notification that the first application program had obtained focus, the methods determine that any unentered input data was destined for a TSF-enabled application program or component, and the procedure includes inserting data corresponding to recognized text based on the ink input data at the focus range and processing the focus change in any order. When focus range data was not associated with the notification that the first application program had obtained focus, methods according to at least some examples of the invention determine that the input data was destined for a non-TSF-enabled application program or component, and the focus change is delayed until after data corresponding to recognized text based on the ink input data is inserted into the first application program.

In such example methods, the procedure of notifying the TSF manager object when a focus change has or is about to occur may include sending a blocking COM call from the first application program to the TSF manager object, which results in an interruption of processing in the application program until the call is responded to or returned. In response to the blocking COM call, the methods further may include determining whether entry of ink input data had started and not finished in the first application program. When entry of ink input is incomplete, processing proceeds as described above. However, when a determination is made that no entry of ink input data had started and not finished when the blocking COM call was received, the blocking COM call may be promptly returned or responded to by the TSF manager object so that processing may continue in the application program. Determining whether entry of ink input data had started and not finished when the blocking COM call was received may take place in any manner without departing from this invention. In at least some example procedures, this determination may include, for example, determining if an ink input object is associated with the TSF manager object.

Still additional methods in accordance with at least some examples of this invention may include, for example: (a) sending data to a manager object indicating a first range of an application program that has obtained focus; (b) receiving input data including information destined for the first range; (c) creating an input object for receiving the input data; (d) associating the input object with the manager object; (e) storing data identifying the first range in the input object; (f) recognizing the input data to thereby provide data corresponding to recognized text associated with the input data; (g) sending data corresponding to the recognized text to the input object; (h) sending data corresponding to the recognized text and data identifying the first range from the input object to the manager object; (i) sending data corresponding to the recognized text and data identifying the first range from the manager object to the application program; and (j) inserting data corresponding to the recognized text at the first range in the application program. In at least some examples of this method, a change in focus may be received after receipt of the input data has started but before the data corresponding to the recognized text is inserted at the first range. Processing may continue, e.g., in one of the various ways described above, such that the change in focus does not affect where the data corresponding to the recognized text is inserted in the application program.

More detailed examples of these aspects according to the invention may include: (a) notifying a TSF manager object that a first range in a TSF-enabled application program has obtained focus and receiving data at the TSF manager object identifying the first range associated with the focus; (b) receiving ink input data in an ink input area; (c) creating an input object for receiving the ink input data from the ink input area; (d) associating the input object with the TSF manager object; (e) storing data identifying the first range associated with the focus in the input object; (f) recognizing the ink input data to thereby provide data corresponding to recognized text associated with the ink input data; (g) sending data corresponding to the recognized text to the input object; (h) sending data corresponding to the recognized text and data identifying the first range associated with the focus from the input object to the TSF manager object; (i) sending data corresponding to the recognized text and data identifying the first range associated with the focus from the TSF manager object to the TSF-enabled application program; and (j) inserting data corresponding to the recognized text at the first range associated with the focus in the TSF-enabled application program. Again, in these example methods, a change in focus may be received after receipt of the ink input data has started but before the data corresponding to the recognized text is inserted at the first range. In such instances, however, the change in focus will not affect where the data corresponding to the recognized text is inserted in the TSF-enabled application program.

In the various example methods and aspects of the invention described above, any type of input data may be processed without departing from the invention, such as data from a keyboard, a touch pad, a mouse, a "pen" type input device (e.g., electronic ink input), speech input, etc. At least some aspects of methods according to the invention are well suited for accepting input data that is subjected to an intermediate recognition, conversion, or translation step prior to its actual insertion into an electronic document, application program, and/or component (e.g., electronic ink data, speech input data, or the like that is being recognized, converted, and/or translated).

Any change in focus may induce or activate processing and methods in accordance with examples of this invention, like the processing and methods described above. As examples, the change in focus may change focus from a first range in a first application program to a second range in the first application program; the change in focus may change focus from the first range in the first application program to a different, independent application program; etc. Depending on the system or method, the change in focus may be processed before or after the insert-data is inserted at the first range without departing from the invention. However, in methods in accordance with at least some examples of the invention, the focus change will not affect the range where the input data is inserted in the application program.

Additional aspects of the invention relate to systems for performing various input and focus processing methods, including the methods described above. Such systems may include, inter alia: an input system for receiving input data (e.g., an electronic ink input, a speech input, a keyboard input, a mouse input, etc.); and a processor system, e.g., including one or more processor devices and/or associated components programmed and adapted to process the input data, e.g., by the various methods described above.

Still additional aspects of the invention relate to computer-readable media including computer-executable instructions stored thereon for processing input and/or focus change data, as well as for operating various computer systems and/or performing various focus processing methods, including the various systems and methods described above.

III. Example Hardware

FIG. 1 illustrates a schematic diagram of a general-purpose digital computing environment that may be used to implement various aspects of the present invention. In FIG. 1, a computer 100 includes a processing unit 110, a system memory 120, and a system bus 130 that couples various system components (including the system memory 120) to the processing unit 110. The system bus 130 may be any of several types of bus structures including a memory bus or memory controller, a peripheral bus, and a local bus using any of a variety of bus architectures. The system memory 120 may include read only memory ("ROM") 140 and random access memory ("RAM") 150.

A basic input/output system 160 ("BIOS"), which contains the basic routines that help to transfer information between elements within the computer 100 (such as during start-up), is stored in the ROM 140. The computer 100 also may include a hard disk drive 170 for reading from and writing to a hard disk (not shown), a magnetic disk drive 180 for reading from or writing to a removable magnetic disk 190, and/or an optical disk drive 191 for reading from or writing to a removable optical disk 182, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories, read only memories, and the like, also may be used in the example operating environment.

A number of program modules can be stored on the hard disk drive 170, magnetic disk 190, optical disk 182, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices may be connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 1, if desired, the pen digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically may include many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 may be connected to the local area network 112 through a network interface or adapter 114. When used in a WAN networking environment, the personal computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in a remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 1 environment shows one example environment, it will be understood that other computing environments also may be used in systems and methods according to this invention. For example, one or more examples of the present invention may use an environment having fewer than all of the various aspects shown in FIG. 1 and described above, and these aspects may appear in various combinations and subcombinations that will be apparent to one of ordinary skill. Additional features from those shown in FIG. 1 also may be included in environments useful with this invention.

Figure 2:
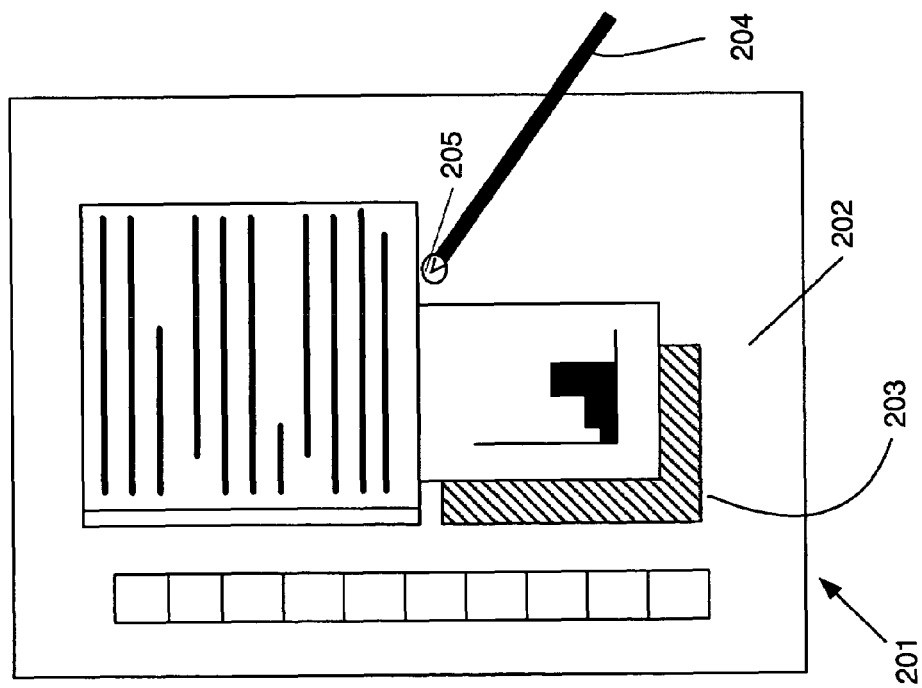
FIG. 2 illustrates an example pen-based personal computing environment in which at least some aspects of the present invention may be implemented.

FIG. 2 illustrates a pen-based personal computer ("PC") 201 that may be used in accordance with various aspects of the present invention. Any or all of the features, subsystems, and functions in the system of FIG. 1 can be included in the computer of FIG. 2. The pen-based personal computer system 201 includes a large display surface 202, e.g., a digitizing flat panel display, such as a liquid crystal display ("LCD") screen, on which a plurality of windows 203 is displayed. Using stylus 204, a user can select, highlight, and write on the digitizing display area and thereby enter electronic ink data into the system. Examples of suitable digitizing display panels include electromagnetic pen digitizers, such as pen digitizers available from Mutoh Co. (now known as FinePoint Innovations Co.) or Wacom Technology Co. Other types of pen digitizers, e.g., optical digitizers, also may be used. The pen-based computing system 201 interprets gestures made using stylus 204 in order to manipulate data, enter text as electronic ink, and execute conventional computer application tasks, such as creating, editing, and modifying spreadsheets, word processing programs, and the like.

The stylus 204 may be equipped with buttons or other features to augment its capabilities. In one example, a stylus 204 could be implemented as a "pencil" or "pen," in which one end constitutes a writing portion 205 and the other end constitutes an "eraser" end, and which, when moved across the display, indicates portions of electronic ink on the display that are to be erased. Other types of input devices, such as a mouse, trackball, keyboard, or the like also may be used. Additionally, a user's own finger could be used as an input device, e.g., for selecting or indicating portions of the displayed image on a touch-sensitive or proximity-sensitive display. Consequently, the term "user input device," as used herein, is intended to have a broad definition and encompasses many variations on well-known input devices.

Recently, pen-based computing systems that accept user input via an electronic pen and/or display at least some forms of input as "electronic ink," e.g., of the type described above, have increased in popularity. Use of electronic ink input as opposed to conventional pen and paper is advantageous in many respects. For example, electronic ink input may be electronically stored, filed, and cataloged for future use, which enables it to be easily maintained, located, and shared with others. Additionally, because electronic ink input can be recognized and converted to conventional machine-generated text (e.g., text insertable into, readable by, and useful by conventional computers), it can be electronically stored, searched, and otherwise used on the computer, for example, in conventional word processing documents and programs, in spreadsheets, in email programs, in document management programs, in web browsers, and the like. Handwriting recognition systems are commercially available that allow handwritten electronic ink input to be converted to machine-generated text. One example of a handwriting recognizer is that provided with the Windows XP Tablet PC Edition™ operating system (available from Microsoft Corporation of Redmond, Wash.), although other handwriting recognizers also are known and may be used without departing from the invention.

In various examples, pen-based computer operating systems provide an ink platform as a set of component object model ("COM") services that an operating system and/or an application program can use to capture, manipulate, recognize, and store ink and/or other pen actions or events. The ink platform also may include a mark-up language including a language like the extensible markup language ("XML"). Additional examples of the ink platform may use the distributed component object model ("DCOM") implementation. Yet further implementations may be used including the Win32 programming model and the .Net programming model from Microsoft Corporation. Such platforms are commercially available and known in the art. Electronic ink data may be stored in an ink serialized format ("ISF") or in any other suitable or desired manner, including in conventional manners known to those skilled in the art.

In addition to use with full performance pen-based computing systems or "tablet PCs" (e.g., convertible laptops or "slate" type tablet PCs), aspects of this invention may be used in conjunction with other types of pen-based computing systems and/or other devices that accept data as electronic ink and/or that accept, process, or display electronic pen or stylus input, such as: hand-held or palm-top computing systems; personal digital assistants; pocket personal computers; mobile and cellular telephones, pagers, and other communication devices; watches; appliances; and any other devices or systems that include monitors or other display devices and/or digitizers that present printed or graphical information to users and/or allow input using an electronic pen or stylus or that can process electronic ink collected by another device (e.g., a conventional desktop computer that can process electronic ink collected by a tablet PC).

Features of the invention now will be described in conjunction with the remaining figures, which illustrate various examples of the invention and/or contain information to help explain the invention. The specific figures and information contained in this detailed description should be construed as providing examples of the invention and not as limiting the invention.

IV. Example Systems, Methods, and Computer-Readable Media According to the Invention A. Examples of Environments and/or Input Situations that May Benefit from Implementation of Systems and Methods According to the Invention As described above, aspects of the present invention relate generally to systems and methods that process input data (such as electronic ink data, speech input data, keyboard input data, mouse input data, etc.), including focus change data, in a manner so that the input is inserted in a way that better comports with the user's original intent. The following description, in conjunction with FIGS. 3A through 7E, illustrates examples of environments and/or input situations that may benefit from use of systems and methods in accordance with at least some examples of this invention.

Figure 3A:
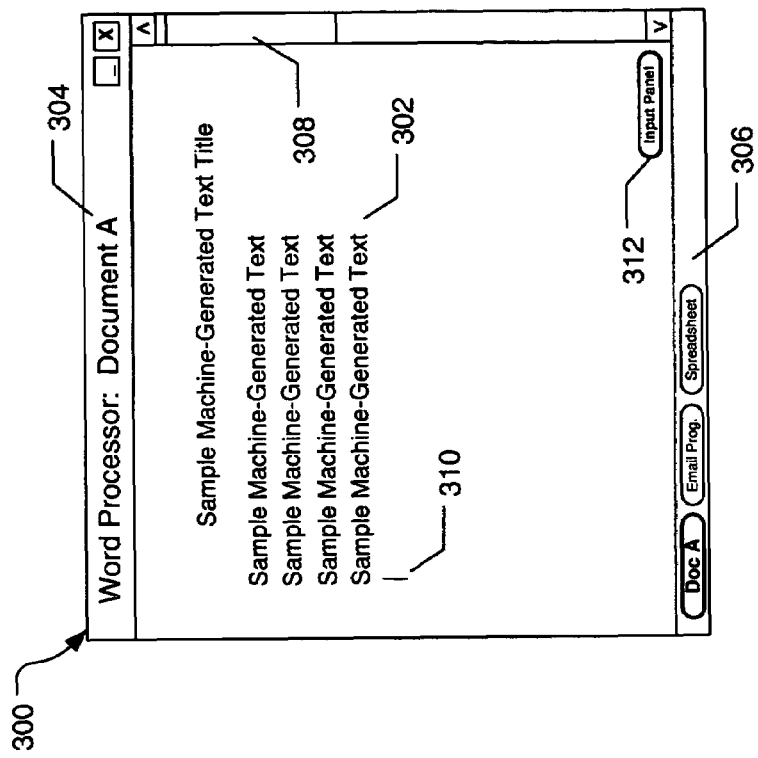

FIG. 3A generally illustrates an example word processing electronic document 300 as it may appear on a user interface screen of a personal computer, such as a pen-based computing system. The document 300 contains machine-generated electronic text 302, although, if desired, it may include graphics, pictorial information, electronic ink, and/or any other desired data or information, including conventional data and information as is known in the art. As is conventional, the user interface includes an active document title bar 304, an application bar 306, a scroll bar 308, and other conventional features that are known and used in conventional GUIs. A cursor 310 (e.g., a blinking caret or any other cursor indicator, including conventional cursor indicators known in the art) illustrates the focus location of this electronic document 300. The cursor 310 indicates the current location where new input will be inserted in the electronic document 300, should new input be directed to this electronic document 300 (also called an "insertion point" in this specification).

In use, a user may wish to edit or otherwise add new information to this electronic document 300. One avenue of doing so, in at least some examples of the invention, is through the use of a text input panel or "TIP." In the illustrated example, a TIP may be activated by tapping the electronic pen or stylus on the "input panel" icon 312 (i.e., a pen-down event quickly followed by a pen-up event) shown in the bottom right corner of the electronic document 300 window. This action, in this example system and method, opens a text input panel window 320, as shown in FIG. 3B. The text input panel window 320 of this example includes an ink input area 322 into which a user can enter electronic ink data using the stylus. In use, a user will position the cursor 310 at a desired insertion location in the electronic document 300 (if necessary) (e.g., by tapping the stylus at the desired insertion location, clicking a mouse button at the desired insertion location, etc.), open the text input panel window 320 (e.g., by tapping icon 312) and write the desired input in electronic ink in the ink input area 322. In the illustrated example, a user has written "Hello there!" in the ink input area 322 of the text input panel window 320.

Once written in the ink input area 322, the input must be inserted into the electronic document 300 at the desired location. However, in this example system and method, before the input is inserted into the electronic document 300, it must be converted from handwritten electronic ink information to recognized and machine-generated text. This recognition process may be initiated in any manner, for example, by a user tapping the "insert" icon 328 with the stylus, automatically after a predetermined delay, when a focus change occurs, etc.

As described above, conventional handwriting recognition programs are known and are conventional and commercially available. Handwriting recognition, however, takes time, and in some instances a user will continue working on his/her computer while handwriting recognition is in process and/or before the recognized text is actually inserted into the electronic document 300. For example, as illustrated in the application bar 306 of FIG. 3B, in this example scenario and implementation, in addition to the word processing document ("Doc A"), the user has an email application program and a spreadsheet application program up and running on the computer system (as evidenced by icons 324 and 326, respectively, in the application bar 306). Once the handwritten input is entered in the ink input area 322, a user may quickly shift from electronic document A 906 to one of the other open application programs, e.g., by tapping the stylus on an icon (e.g., 324 or 326) in the application bar 306. Tapping another application program's icon in the application bar 306 will initiate a focus change from electronic document A 906 to the newly selected application program. In at least some instances, the user will initiate this focus change before the newly inserted handwritten text is recognized and/or inserted into the electronic document 300 at cursor location 310. Indeed, in at least some instances, the user will initiate the focus change by tapping icons 324 or 326 without actually tapping the "insert" icon 328 and/or without taking other steps to initiate handwriting recognition and the machine-generated text insertion process and/or without ensuring that the newly entered handwritten text is correctly inserted at the desired location in electronic document 300. Nonetheless, despite the focus change, and even when insert icon 328 is not tapped, the user typically still will desire the ink input to be recognized and inserted at the cursor location 310 in electronic document 300.

Changing focus in this manner, in conventional pen-based computing systems and methods, may have a varying and unpredictable effect. For example, when a user taps the email program icon 326 in FIG. 3B (and thereby initiates a focus change), this action immediately causes handwriting recognition to begin by closing the text input panel window 320 and opens the email program window 330 (see FIG. 3C). In the illustrated example, the email program had previously been opened by the user and a new email message had been started. This is shown in FIG. 3C by the incomplete email message in message window 332. When the user taps the email program icon 324 in application bar 306, he/she is immediately transferred to the email document 330, and focus is established in that document 330 at the last previously established focus location, as illustrated by cursor 334 in this example structure. Alternatively, when a different application program is activated and/or re-entered, focus may be shifted to any desired default location in this application program.

Figures 3D, 3E:
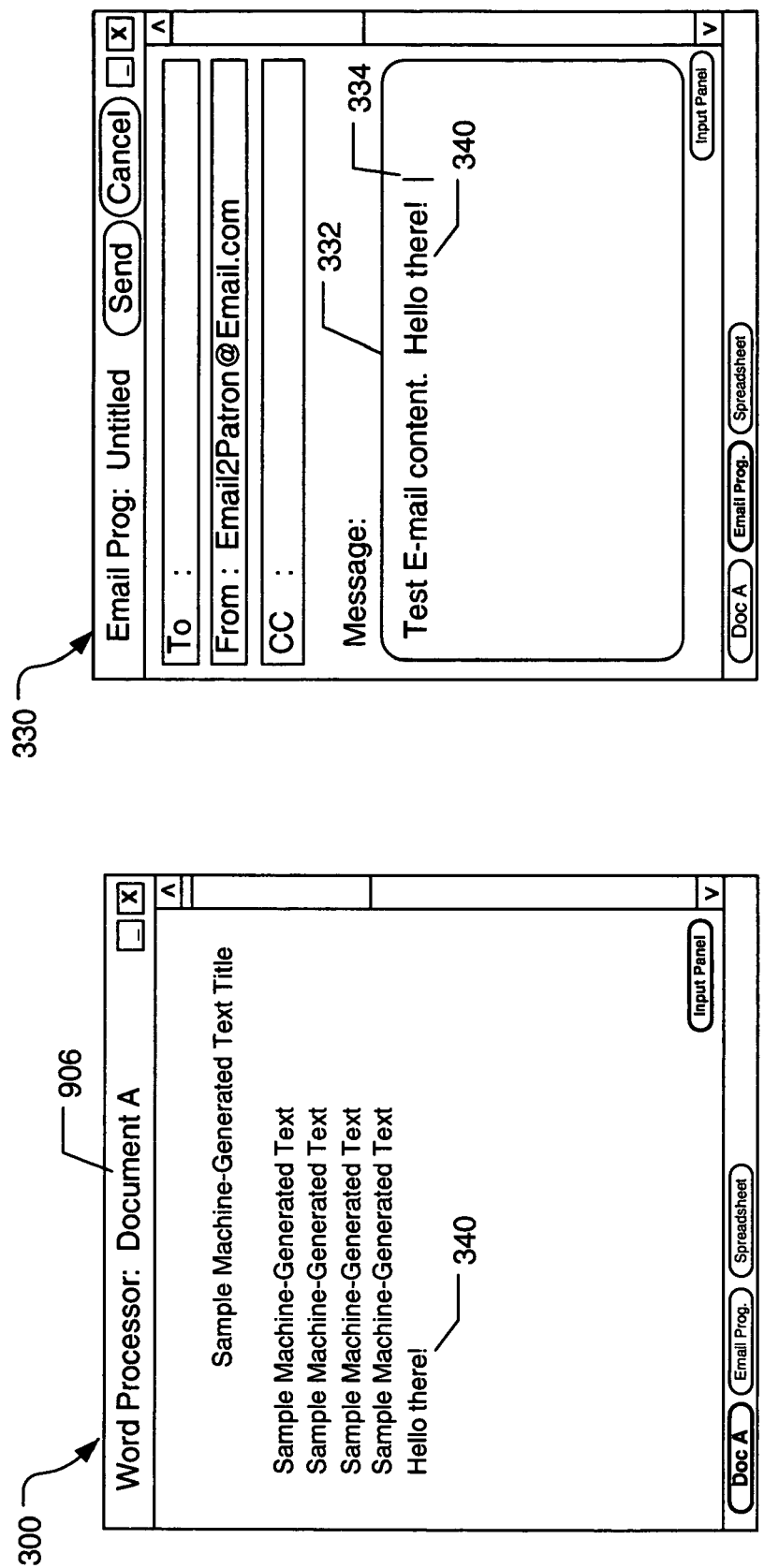

Accordingly, in the procedures and scenario described above in conjunction with FIGS. 3A through 3C, a focus change occurred shortly after electronic ink had been entered into the system. The insertion location for recognized data corresponding to the electronic ink, in conventional systems and methods, in such a situation is quite unpredictable. In essence, the final insertion location(s) in conventional systems and methods depends on where the focus actually is located at the time the system proceeds with the text insertion (e.g., after recognition is completed for some or all of the handwritten text and that portion of the recognized text is inserted). For example, FIG. 3D illustrates one possible outcome associated with the above input event scenario. More specifically, as shown in FIG. 3D, recognized and machine-generated text 340 corresponding to the handwritten input from ink input area 322 is inserted into the word processing electronic document 300 at the original cursor location. In this example scenario, recognition and insertion of the machine-generated text 340 was completed before the focus change took effect (i.e., before the user's desired switch to email document 330 took place). Research and studies of pen-based computing systems and methods indicate that this outcome typically is that most desired by users in this input situation (i.e., in most instances, users expect recognized text corresponding to their handwritten input to be inserted in an electronic document at the cursor or insertion point location at the time their writing began irrespective of where focus resides at the time of text insertion).

Conventional pen-based computing systems and methods, however, do not guarantee the outcome associated with FIG. 3D. For example, if conventional pen-based computing systems and methods recognize and process the focus change to email document 330 before the handwritten input from ink input area 322 was recognized and inserted, then the recognized text may be inserted at the wrong location. FIG. 3E shows a possible example outcome scenario when a user, in the situation shown in FIG. 3C, quickly shifted focus after entering the handwritten input and/or when a user used the focus change as a trigger to initiate the recognition and text insertion actions. As shown in FIG. 3E, this quick focus change resulted in the recognized and machine-generated text 340 corresponding to the user's handwritten input from ink input area 322 being inserted at the cursor location 334 in the email message 332.

Figures 3F, 3G:
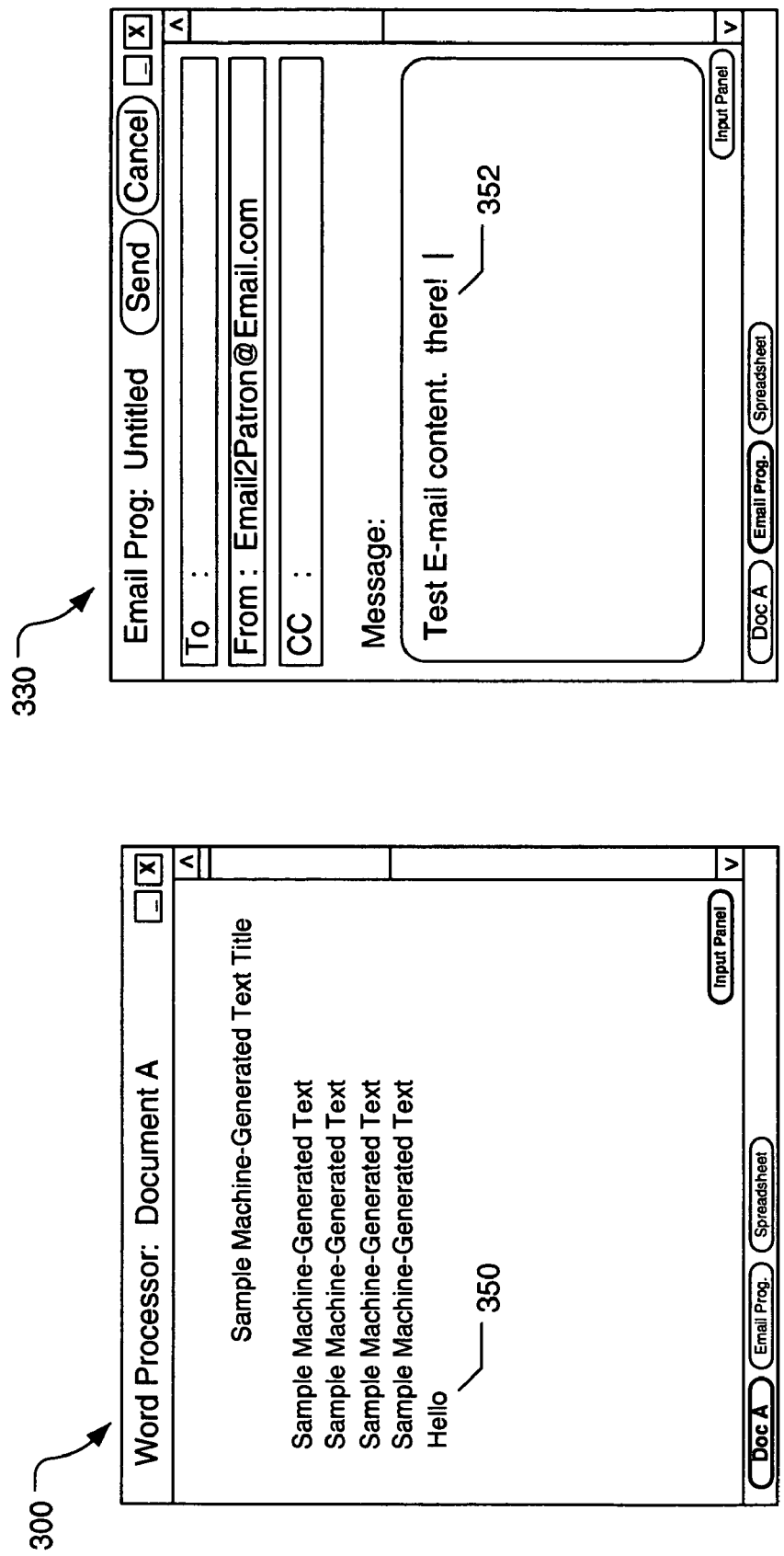

Additional difficulties and/or misdirections may result from the lag in time between original data input and its recognition and insertion, e.g., when a focus change occurs during this time period. For example, as shown in FIGS. 3F and 3G, this time delay may cause one portion of the input handwritten data to be recognized and inserted in one application program (e.g., the word "Hello" 350 being directed to the word processing document 300 in FIG. 3F) and another portion of the input handwritten data to be recognized and inserted in a different application program (e.g., the word "there!" 352 being directed to the email document 330 in FIG. 3G). This type of misdirection may occur, for example, when recognition and insertion of the input handwritten data began before a focus change occurred but finished after it occurred.

Accordingly, there are various ways that input data may be directed (and misdirected) when a focus change occurs in close temporal proximity to data input, recognition, and/or insertion. Moreover, the final results are unpredictable in this situation. Typically, when handwritten input is generated in a first application program having focus (e.g., in the word processing document 300 in this example), users usually desire the recognized text corresponding to this handwritten input to go to the first application program at the location of focus when the input began. Generally, users do not desire for the recognized text to be imported into another application program and/or to another focus location (e.g., like the email program in this example) established after input began. This misdirection of input data is unpredictable, and it can lead to errors and substantial user frustration.

Figures 4C, 4D:
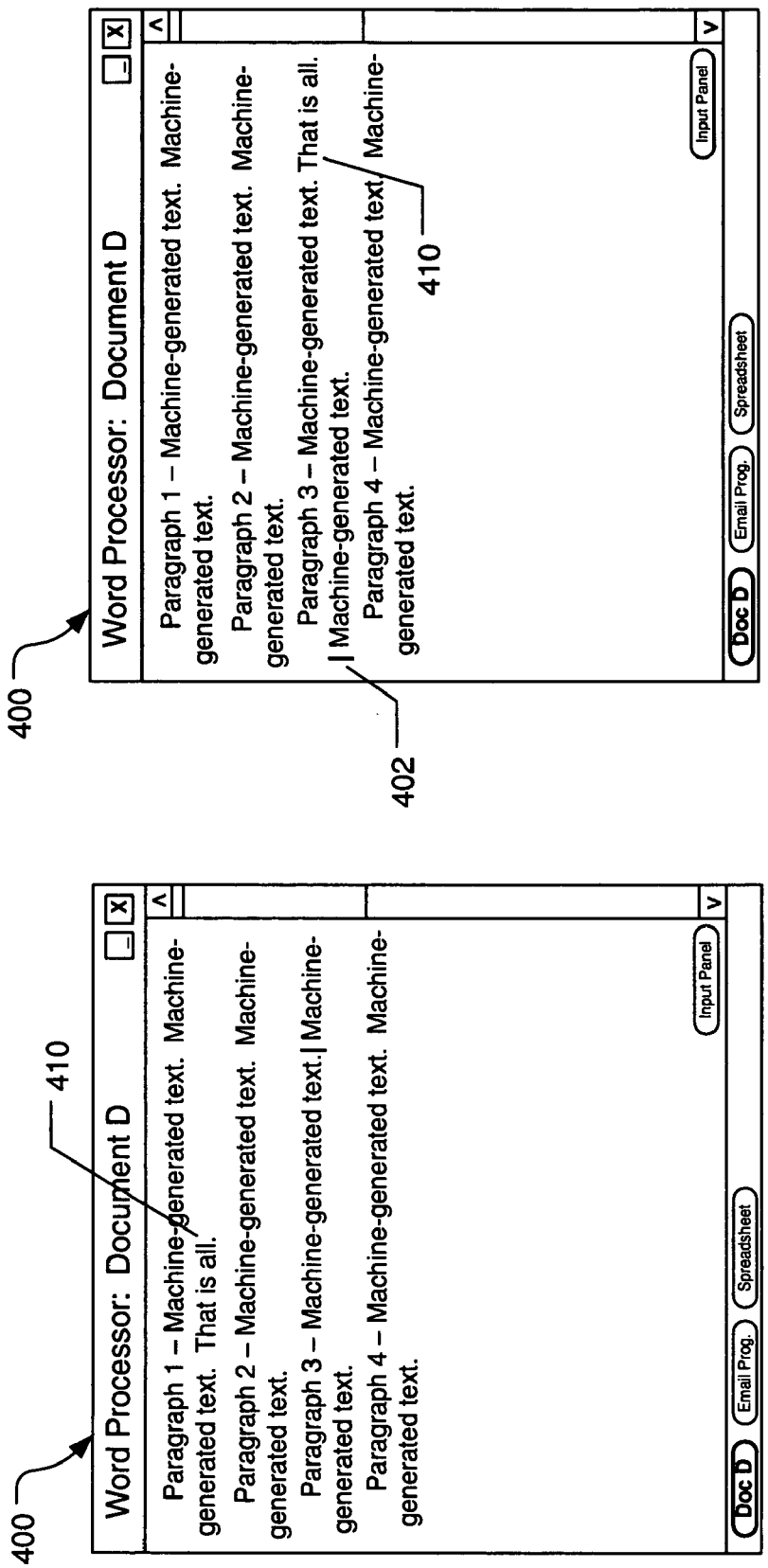

Input data misdirection of this type is not limited to situations where focus changes move focus from one application program to another as described above. Rather, misdirected recognized input data may result from focus changes included within a single electronic document. FIGS. 4A through 4E illustrate an example. As shown in FIG. 4A, an electronic document 400 is opened in a word processing application program, and the focus location in electronic document 400 is dictated by a cursor or insertion point location 402. In the illustrated situation, a user has activated a text input panel window 404 and has handwritten text ("That is all." in the illustrated example) that he/she wants inserted into the electronic document 400 at the cursor location 402. Optionally, the user may tap the "insert" icon 406 to initiate the recognition and text insertion procedures. Alternatively, the recognition and text insertion procedures may begin in other ways, for example, as a result of initiation of a focus change, cursor location movement, after a predetermined delay with no input, etc.

FIG. 4B illustrates a time later in the scenario in which a focus change event was initiated when a user tapped the stylus in the middle of "Paragraph 3," thereby moving the cursor or insertion point location 402 from the end of "Paragraph 1" to the middle of "Paragraph 3." This action, as noted above, also initiated a focus change event, changing focus from the end of "Paragraph 1" to the middle of "Paragraph 3." Notably, as illustrated in FIG. 4B, the text input panel window 404 disappeared from the screen as a result of this focus change action.

Figures 4E, 5A:
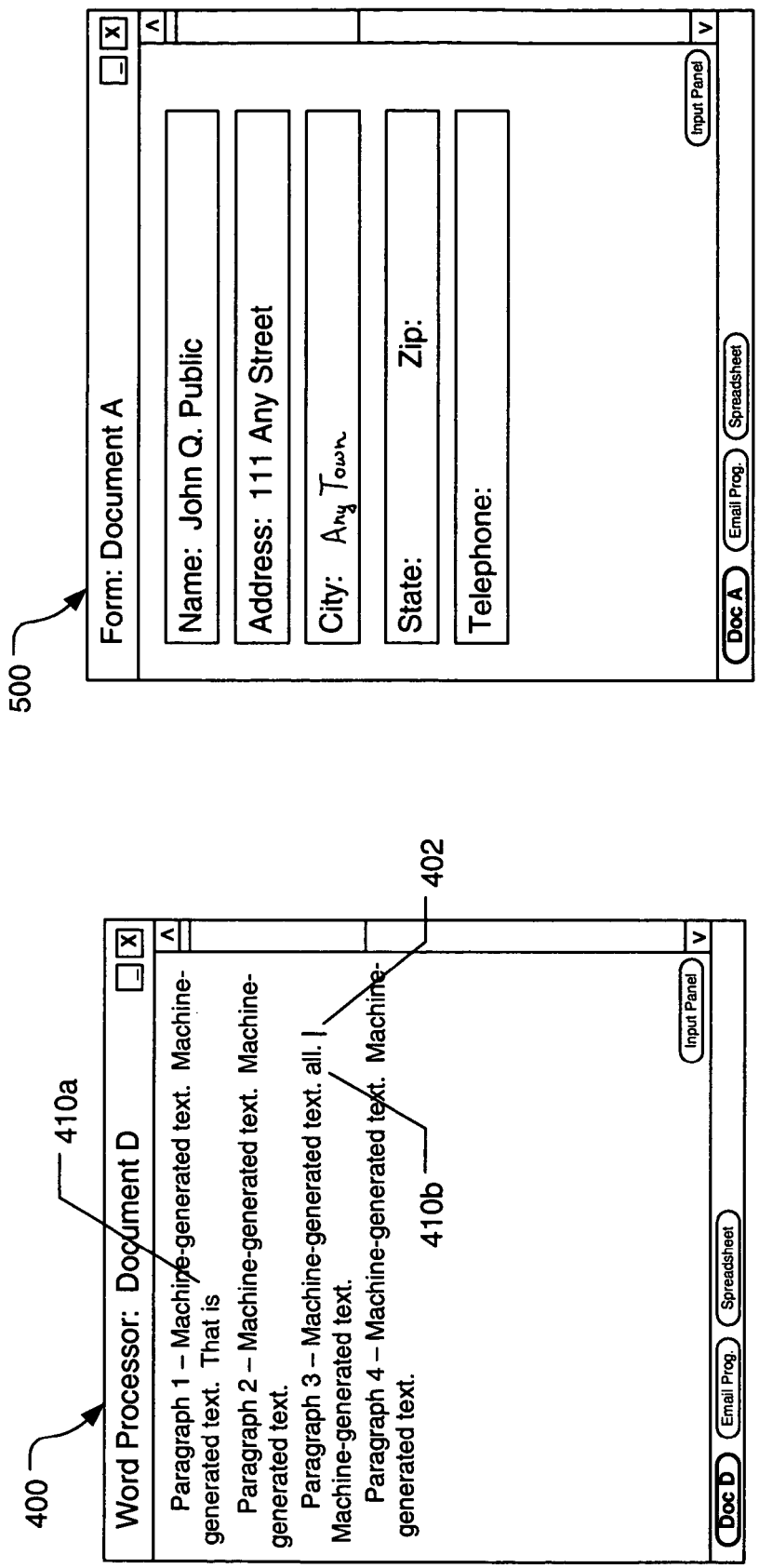

The actual, final location of the recognized text corresponding to the input ink data, however, depends on the status of the recognition and insertion procedures at the time the focus change event is actually processed by the system. For example, as illustrated in FIG. 4C, the recognition and insertion procedures may be completed before the focus change event is processed, resulting in the insertion of the recognized text 410 at the desired location (e.g., at the end of Paragraph 1 in this example). However, if the focus change is processed very quickly (e.g., before or very shortly after the recognition and insertion procedures began) or if the focus change actually triggers initiation of the recognition and insertion procedures, the focus change may be processed before the recognition and insertion procedures are completed. This scenario, as illustrated in FIG. 4D, may result in the undesired insertion of the recognized text 410 at the later focus location (e.g., corresponding to the new cursor and focus location 402 in Paragraph 3 when the insertion procedure was carried out). Also, as illustrated in FIG. 4E, processing of the focus change at some time intermittent time during the recognition and/or insertion processes may result in splitting the insertion locations of the recognized text (e.g., some recognized text 410a inserted at the original focus location and some recognized text 410b inserted at the later focus location).

Typically, when a user starts generating handwritten input when focus is at a first location in an application program (e.g., in "Paragraph 1" in this example), the user usually desires the recognized text corresponding to this handwritten input to go to this first focus location, irrespective of the focus location at the time the text insertion actually takes place. Generally, users do not desire for the recognized text to be moved to another, later-established focus location in an electronic document (e.g., like "Paragraph 3" in this example). This type of misdirection of input also can lead to errors and substantial user frustration.

Aspects of this invention are not limited to use with formal, independent text input panel windows like those shown in FIGS. 3B and 4A. At least some pen-based computing systems and application programs that operate on them are able to accept ink input anywhere on the digitizer panel and/or the display screen. FIG. 5A illustrates an example of such an application program, which generates electronic document 500. The electronic document 500 of this example includes an electronic form that a user can fill out using handwritten electronic ink in the various regions or fields of the form (of course, any type of electronic document or user interface may be provided without departing from the invention). Each region or field of the form (e.g., the name region, street address region, city region, state region, zip code region, telephone number region, etc.) may represent a separate region or field capable of receiving focus, e.g., by tapping the stylus in that region of the form, by beginning to write in that region of the form using the stylus, by tabbing from one region to the next, etc. FIG. 5A illustrates the electronic document 500 in the process of being filled out. The user had previously entered his name ("John Q. Public") and address ("111 Any Street") in electronic ink, and that ink had been recognized and replaced by the recognized machine-generated text. At the time of the screenshot of FIG. 5A, the user had handwritten the words "Any Town" in the "City" field, thereby providing focus to that field when the writing was initiated. The ink in the "City" field, however, had not yet been recognized at the time shown in FIG. 5A.

In such systems, ink input recognition and machine-text insertion procedures may begin and/or be triggered in any desired manner without departing from the invention. For example, a predetermined delay after ink entry may be used to trigger these procedures without further user action. As another example, the user could initiate these activities in some manner (e.g., by tapping an "insert" icon, tapping in another field, hovering over another field, changing focus to another application program or another area or field in this application program, etc.). As shown in FIG. 5B, in this example, the user changed focus, and thereby initiated the ink recognition and insertion procedures, by tapping the pen down in the "State" field of the form (as evidenced by the "X" 502 in the "State" field). Again, as with the examples above, the ultimate end location of the recognized and machine-generated text corresponding to the "Any Town" ink entered in the "City" field depends on where focus is located when the recognition and/or insertion procedures take place. For example, as shown in FIG. 5C, if the "City" field still retains focus when recognition and insertion are completed, this field then will receive the machine-generated text 510, as originally intended by the user.

If, however, focus had shifted and the "State" field had obtained focus before the recognition and insertion procedures had been completed, then the machine-generated text corresponding to the "City" entry may be received in the "State" field, as shown in FIG. 5D. More specifically, at the specific time shown in the example of FIG. 5D, the "State" field had obtained focus and the user had begun inserting ink (the letter "M") to fill in this field. After this electronic ink entry had started, however, the recognition and insertion procedures were completed, and the recognized machine-generated text "Any Town" was inserted into the electronic document 500 at the location with focus (i.e., misdirected to the "State" field, in this specific example). The present focus location is shown by caret 512 in FIG. 5D, although, of course, any desired focus or insertion location representation (or even no caret or insertion location representation) may be present without departing from the invention.

FIG. 5E illustrates another potential outcome in this input scenario, for example, in instances when machine-generated text insertion began (e.g., for part of the ink entry) before the focus change was processed, but it finished (e.g., for another part of the ink entry) after the focus change was processed. In this example, the word "Any" was correctly inserted in the "City" field, but then the focus changed and the word "Town" was misdirected to the "State" field due to the intervening focus change. As shown in FIG. 5E, in this example the user also began inserting ink input data into the "State" field shortly after the misdirected input was inserted.

Again, as is typical, when handwritten input is generated with focus at a first focus location in an application program (e.g., in the "City" field in this example), users usually desire the recognized text corresponding to this handwritten input to go to this first focus location when the input began. Generally, users do not desire for the recognized text to be moved to another location in the electronic document (e.g., like the misdirection to the "State" field in this example), even if a focus change occurs before the recognition and insertion procedures are completed. Moreover, users expect to easily move from place to place (or field or field) in this type of electronic document, and immediately begin inputting ink, without their movements causing misdirection and misplacement of previously entered ink. These types of misdirection errors can lead to input errors and substantial user frustration.

Focus and/or focus change events are not limited to movement or relocation of a cursor or insertion point within an application program and/or between two application programs. Any type of focus and/or focus change event and/or any cause of a focus change may be involved and benefit from use of systems and methods in accordance with examples of this invention. For example, other focus and/or focus change events may involve selection (e.g., akin to placing the cursor at a selected location, holding down the mouse button, and moving the mouse to select text, graphics, icons, or other objects in an electronic display). Block selection, lasso selection, and/or other selection types or actions may be used and may benefit from use of systems and methods in accordance with examples of this invention.

FIGS. 6A through 6D illustrate examples of how focus changes surrounding selection activities may benefit from use of systems and methods according to this invention. FIG. 6A returns us to the example shown in FIG. 4A in which a user is making an effort to insert textual information at cursor or insertion point location 402 in Paragraph 1 of electronic document 400 using text input panel 404. In this example, however, after the electronic ink was entered in the text input panel 404, the user changed focus by making a selection 600 in Paragraph 3, as shown in FIG. 6B (rather than changing focus by moving the insertion or cursor location as shown in FIG. 4B). This selection action triggers the ink recognition and insertion procedures as generally described above. In conventional systems, the location of machine-generated text insertion in this scenario depends on where focus is located at the time the recognition and/or insertion processes are completed. For example, if recognition and insertion are completed by the time the focus change and/or selection procedures are processed, the recognized, machine-generated input will go to its intended location at cursor or insertion point location 402, as shown by text 410 in FIG. 4C. If, however, as shown in FIG. 6C, the selection and/or focus change events are processed before the recognition and/or insertion procedures are completed, the selection 600 will be made first (as shown in FIG. 6B), focus will change to this location in document 400, and the recognized, machine-generated input 410 will replace the selection 600 in Paragraph 3, as shown by text 410 in FIG. 6C. Alternatively, as shown in FIG. 6D, if a first portion of the recognition and insertion procedures are completed before the selection and/or focus change events are processed and a second portion of the recognition and insertion procedures are completed after the selection and focus change events are processed, a first portion of the recognized, machine-generated text may go to the first, desired location (e.g., the words "That is" 410*a* inserted at the original cursor or insertion point location 402 in FIG. 6D) and a second portion of the recognized, machine-generated text may undesirably replace the selection 600 in Paragraph 3 (e.g., the word "all." 410*b* in FIG. 6D).

Again, this type of misplacement and misdirection of input, as well as the unpredictability of the computer's response to these input activities, can lead to errors and substantial user frustration.

Focus changes may occur during the lag time between original data entry and its recognition, conversion, translation, and/or insertion into an electronic document for any number of reasons in various systems and methods. Many of the examples described above in conjunction with FIGS. 3A through 6D include user-initiated focus changes, e.g., by a user moving from one range in an application program to another, by a user moving between open application programs, or the like. Launching a new program (whether user-initiated or otherwise) also may result in a focus change. Focus changes also may occur automatically, in at least some examples of the invention, e.g., under control of or initiated by the operating system, a separate application program, and/or an external source. For example, focus may change when a "notification" associated with an email application program is provided (e.g., to advise a user of an incoming email). Focus changes also may occur as a result of pop-up messages (e.g., error messages, informational messages, etc.) from the operating system, in a web browser, from an external source (e.g., over the internet), and the like.

Additionally, in the specific examples described above in connection with FIGS. 3A through 6D, focus changed between ranges and/or applications programs or components that were capable of receiving the input, and therefore, the machine-generated text based on the ink input was not lost, it was misdirected. This is not always the case. For example, when the new application program, window, or range receiving focus is not capable of receiving user input (e.g., a pop-up advertisement, an email notification window, a web page, the computer's desktop, a newly launched program, etc.), the original ink input may be lost, e.g., when the system attempts to insert the recognized text at the new location receiving focus, it may find it impossible to insert machine-generated text at that location, and the text, as well as the underlying ink input, will be lost. The loss of the original ink and its recognized and machine-generated counterpart also can cause substantial user frustration.

Aspects of this invention also are not limited to use with pen-based computing systems and methods and/or pen-based user input. In other examples, aspects of the invention may be used in conjunction with any type of input and/or on any type of computer system. For example, aspects of the invention advantageously may be used with any type of computer input where there is a delay between entry of the original input and the actual insertion of data corresponding to that original input in an electronic document, wherein focus changes or focus events may occur during the delay (e.g., in systems or methods where input data undergoes recognition, conversion, interpretation, and/or translation prior to insertion in an electronic document). As a more specific example, aspects of the invention may be useful for inputting data into electronic documents via speech input and speech recognition technology. When a user speaks into a computer system equipped with speech recognition technology, the speech typically is recognized, converted to machine-generated text, and then inserted into the electronic document as machine-generated text corresponding to the original spoken text. User and/or system-generated focus changes may occur in the time period between the initiation of the speech input and its recognition and/or insertion into the electronic document, in the same manner that focus changes may occur in the lag time in handwriting recognition systems as described above. As another example, language translation applications (e.g., of handwritten, machine-generated, or spoken input) may result in data entry lag times after the input is initially entered, in the same general manner as described above. Accordingly, aspects of systems and methods according to this invention may be used to assure that input data of various different types and under various different input scenarios is directed to the range having focus when input began and to assure that input is not misdirected to later focus locations and/or split between different focus locations.

Also, computer "conversion" processes also may produce a time lag during which a focus change (and potential misdirection of input data) may occur. Such conversions may occur, for example, when inputting East Asian characters into computer systems (e.g., Kana to Kanji character conversion ("KKC"), Romaji to Kana character conversion (RKC), and the like).

Figure 7B:
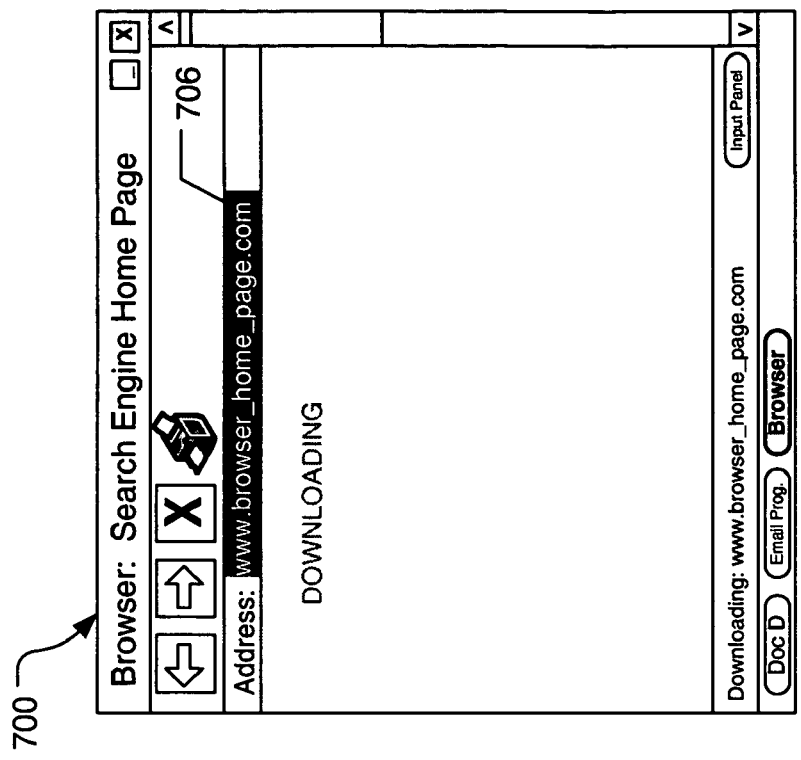
Figure 7A:
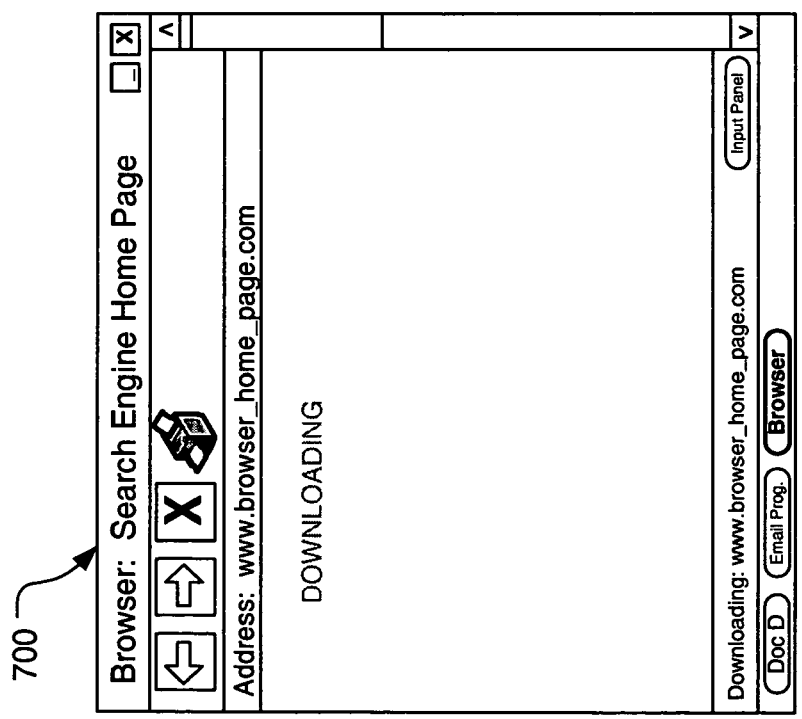

Aspects of the invention also may be of value in processing keyboard input data at times surrounding a focus change. FIGS. 7A through 7E illustrate an example scenario. FIG. 7A illustrates a user interface 700 as it typically may appear when an internet web browser application program is launched. As is conventional, when a browser program is launched, it opens to an initial start location or "home page," e.g., a web page selected by a user or automatically put into place by the computer operating system or web browser program. FIG. 7A illustrates an example browser application program launching as a user opens the browser. In this example, the user has selected a search engine as his/her "home page," and as the application program launches, it starts to open this home page.

In many instances, a user will know where he/she wants to start browsing on the internet when he/she initially launches their internet browser application program. Accordingly, as illustrated in FIG. 7B, a user may attempt to speed up the procedure and move quickly to the ultimately desired web page location by highlighting the browser's home page address in the browser's address field 706 while the home page is still being downloaded. Then, as shown in FIG. 7C, the user may begin typing in the address of the internet page they first wish to visit using the keyboard (or inputting it in some other suitable manner, such as using pen input, a soft keyboard, highlight it from a listing, etc.). In the present example, as shown in FIG. 7C, the user has begun typing in the new address "www.new_page.com." As shown in the browser's taskbar 702, however, while this typing or other input entry is taking place, the browser still is attempting to open the initial browser home page as is conventional when the browser is launched.

Figure 7E:
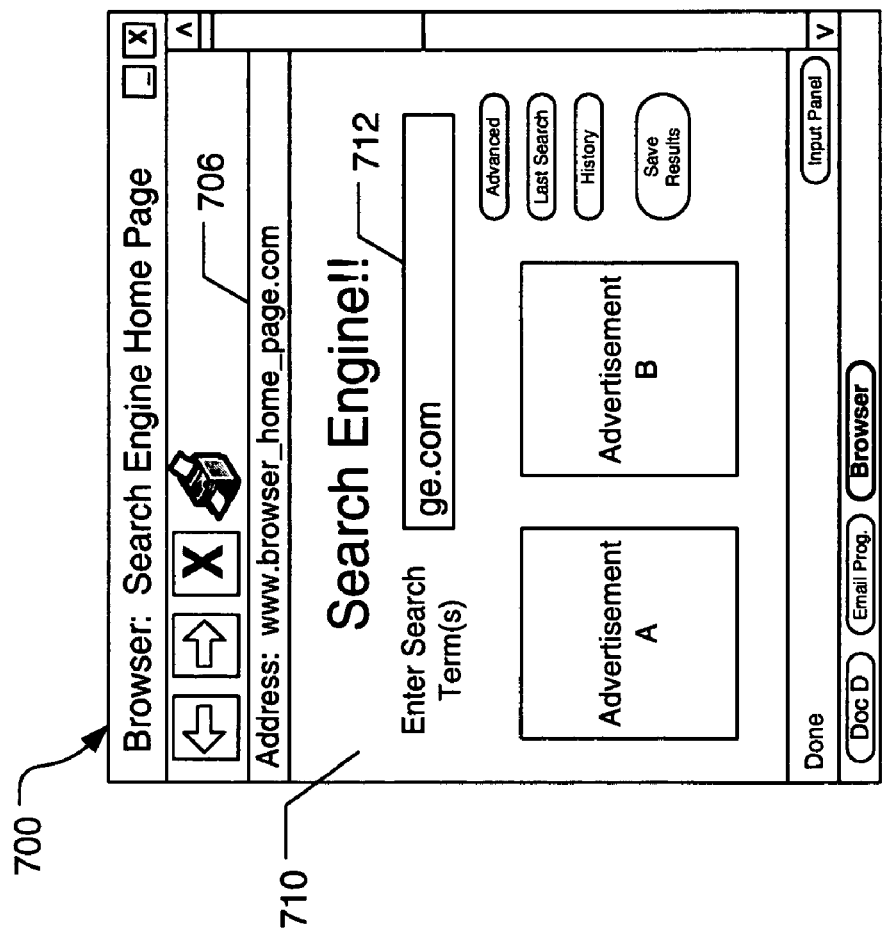

The manner in which conventional systems and methods proceed from here depends, at least in part, on when various things happen. As shown in FIG. 7D, if the user completely enters the new page's internet address (i.e., fully enters "www.new_page.com" in this example) and hits "return" or "enter" before the initial browser home page is downloaded, the browser application program typically will accept the new input and begin searching for and downloading this newly targeted web page, as shown by the browser's taskbar 702 in FIG. 7D. If, however, the browser home page completely downloads before the user types in the newly desired internet address and hits "return" or "enter," the browser home page will be displayed, and this action will supercede the user's ongoing attempt to type in the new internet address. An example of this is illustrated in FIG. 7E. Notably, in FIG. 7E, the browser home page screen 710 pops up, and in this example, because the home page 710 has a field 712 that accepts user input (e.g., a search term field 712 in this example), focus may be provided automatically in this field 712 when home page 710 opens. When a user is entering a new address (e.g., in address bar 706, as shown in FIG. 7C) and the original home page finishes downloading and focus changes to the search field 712 while this new address information still is being entered address bar 706 (e.g., between the keystrokes for the letters "a" and "g" in FIGS. 7C and 7E), the original home page will complete its download and the focus will change, and as shown in FIG. 7E, the original data typed into address bar 706 will be lost (e.g., "www.new_pa," was lost in this example). Additionally, in this example, the last keystrokes (i.e., those entered after the focus change was processed) will be placed in the new field having focus, if any, i.e., in search field 712 in the example illustrated in FIG. 7E. In other examples, if the home page receives focus at a range that cannot accept user input, even the later keystrokes (those entered after the focus change) will be lost. This loss and/or misdirection of the keystroke input data can be frustrating and annoying to users, who now are forced to retype the entire address in address bar 706 in order to move to the originally desired web page.

Accordingly, aspects of the present invention include systems and methods that better handle input data received at or near the time of a focus change event or operation. In at least some examples of the invention, user input data may be accepted, before, during, and/or after focus change events, and the systems and methods will process this input data and the focus change commands in an appropriate manner so as to direct the data to areas of an application program or the operating system that better comport with the user's original intent. In this manner, loss and misdirection of input data may be reduced, minimized, and/or eliminated, thereby lowering user frustration during focus change events. Various example implementations and details of the invention are described below.

While the figures described above illustrate various examples of situations where systems and methods according to the invention may be useful, those skilled in the art will understand and appreciate that these figures merely illustrate example situations. Aspects of the invention may be used in many different situations, and changes and/or modifications to the various example situations described above are possible without departing from the invention.

B. Detailed Description of Example Implementations

As mentioned above, some recently released pen-based computing systems run the Windows XP Tablet PC Edition™ operating system (available from Microsoft Corporation of Redmond, Wash.). Various application programs included with and/or commercially available for use with this operating system support the Text Services Framework described above, e.g., the application programs are "TSF-enabled." Such TSF-enabled application programs include: the newest versions of Microsoft's Word® word processing program, Microsoft's Windows Journal ink processing program, and Microsoft's WordPad program. Many previously available and conventional application programs are not "TSF-enabled" and are not able to take advantage of all of the various features available to TSF-enabled application programs.

Aspects of the present invention, however, enable better handling and insertion of input data at or near the time of a focus change whether or not the application program to which the input data is directed is TSF-enabled. Accordingly, in accordance with at least some aspects of the invention, there are at least two primary approaches or paths for consideration depending on the manner in which the target or destination application program for the input data was written. One approach or path applies to TSF-enabled application programs and components, and another approach or path applies to non-TSF-enabled application programs or components (also referred to as "Legacy" application programs or components in this specification). In at least some example systems and methods according to the invention, code associated with the invention will direct the system to the correct approach or path to use for a particular insertion. This may be necessary, in at least some instances or examples, because an application program may contain both TSF-enabled and non-TSF-enabled components (e.g., an application program, even a TSF-enabled application program, may include one or more third party controls or other controls or components that were not TSF-enabled and that are not possible to TSF-enable from the outside).

Various aspects of the invention and various example approaches and paths are described in detail below with reference to FIG. 8.

1. A TSF-Enabled Path and Approach

As is conventional and known in the art, a TSF-enabled application program 802 will have an instance of the dynamic link library component "TipTSF.dll" 804 running in it, and this instance of the TipTSF.dll component 804 will have full-fidelity TSF data passed to it. When a TSF-enabled application program gets focus, the TipTSF.dll component can (and does) notify a TSF manager object 806 running in "TCServer.exe" 808 of this fact, which causes that TSF manager object 806 to become active. The focus notification is represented in FIG. 8 by arrow 810. Along with notification of this focus event (arrow 810), the TipTSF.dll component 804 passes a TSF "range," to the TSF manager object 806. This "range" includes data representing the location of input focus in the electronic document or the application program.

Sometime after focus is obtained in the application program 802, a user may begin to input data including information destined for the focus range (e.g., a user may begin to write on an input area 812 of a text input panel (e.g., like text input panel windows 320 and 404 shown in FIGS. 3B and 4A, respectively, or like those available via a "Tabtip.exe" command in a Windows XP Tablet PC Edition™ operating system (available from Microsoft Corporation of Redmond, Wash.))). While much of the discussion below will relate to input of electronic ink data, those skilled in the art will understand, as described above, that aspects of this invention are not limited to use with electronic ink input. When entry of this input begins, the input area 812 in this example creates a new input object 814 in TCServer.exe 808. The input area 812 further triggers a notification to the input object 814 that user input has begun. This notification is represented by arrow 816 in FIG. 8. The notification 816 causes the input object 814 to bind to the TSF manager object 806 that is currently active. This binding ensures that when the input is complete, it will be passed to the TSF manager object 806 associated with the application program 802 that had focus at the time input began. The binding also induces the focus range data to be sent from the TSF manager object 806 to the input object 814, where it is cached. This data transfer is represented in FIG. 8 by arrow 818. At any given time, a single TSF manager object 806 may have multiple input objects 814 associated with it and/or bound to it, as illustrated in FIG. 8.

When the input has been entered, the input in this example system and method is recognized, e.g., using conventional handwriting recognition technology, such as the handwriting recognition technology available for use with Microsoft's Windows Journal ink processing program. Once recognized and available in machine-generated text form, the recognized text (along with any associated metadata, such as recognition alternatives) is sent first to the input object 814, as represented by arrow 820. From the input object 814, the recognized text and cached range data then are sent to the bound TSF manager object 806 (represented by arrow 822). At this point, the TSF manager object 806 sees that it got "range" data from the TipTSF.dll component 804 (back at data transfer arrow 810) and/or from the input object 814 (at data transfer arrow 822), and therefore the TSF manager object 806 knows that this incoming data is destined for a TSF-enabled application program (also called a "TSF-enabled insertion"). At that point, the TSF manager object 806 simply passes the text and the range data to the TipTSF.dll component 804 (represented by arrow 824), which tells the TSF framework to insert the recognized and machine-generated text in the application program 802 at the accompanied range. Because of the way the known TSF works in a Windows XP Tablet PC Edition™ operating system (available from Microsoft Corporation of Redmond, Wash.), this action will put the machine-generated text in the right place in the electronic document or application program, even if the user or the system has since changed focus to a different range and/or a different application program altogether.

2. A Non-TSF-Enabled (or "Legacy") Path and Approach

Figure 8:
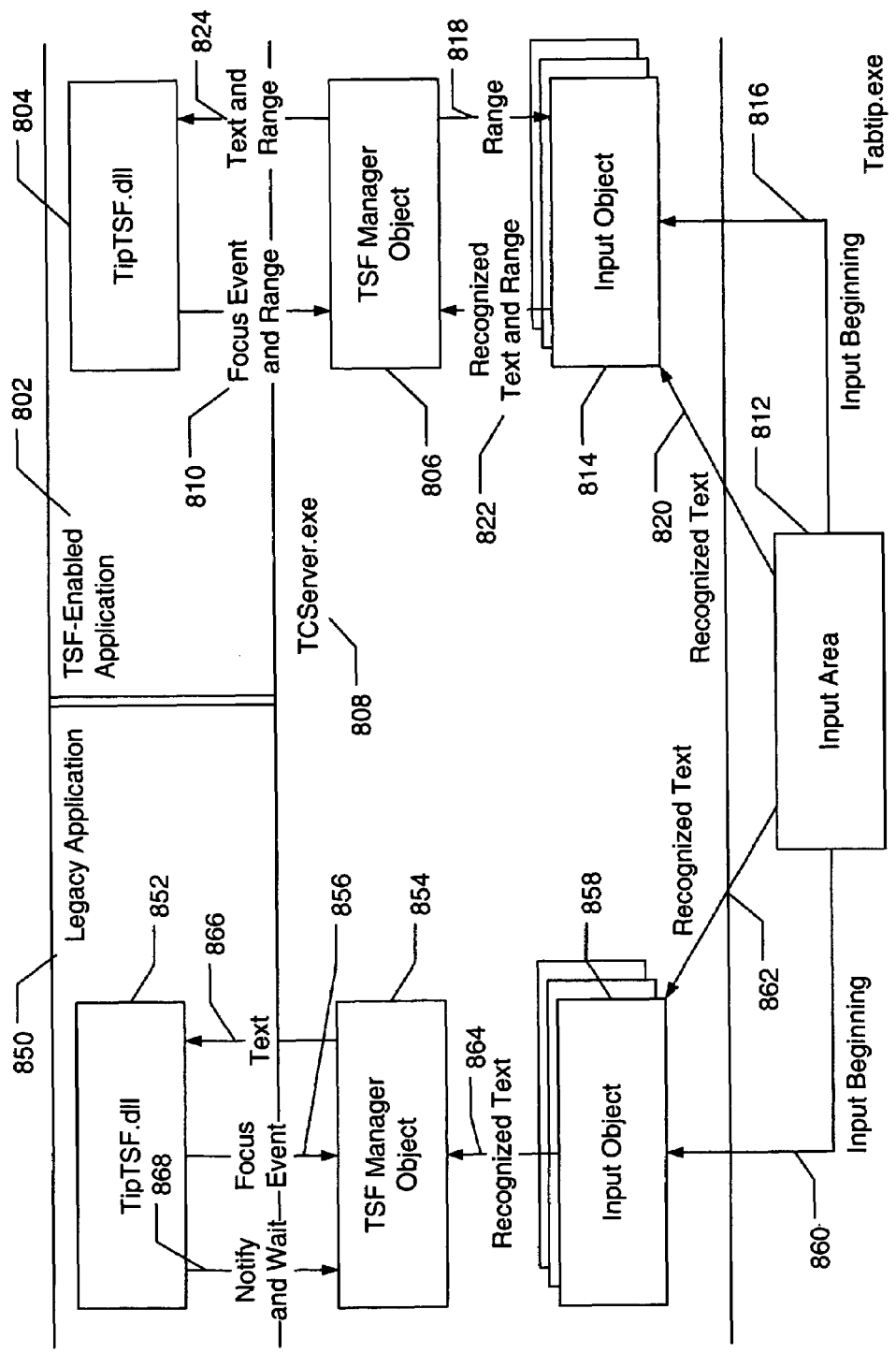
FIG. 8 illustrates examples of features of systems and methods for treating input data in TSF-enabled application programs or components and non-TSF-enabled application programs or components according to some examples of this invention.

FIG. 8 also illustrates example steps and/or components that may be used in accordance with at least some example systems and methods according to the invention involved in inserting input data in a Non-TSF-Enabled or Legacy application program or component.

In at least some respects, this example path and approach function in much the same manner as the example TSF-enabled path and approach described above. Even though a Legacy application program 850 typically will not support TSF and/or all TSF functions, the TSF framework available on a Windows XP Tablet PC Edition™ operating system (available from Microsoft Corporation of Redmond, Wash.) still opens an instance of a TipTSF.dll component 852 in the application program 850. The difference is that, in this Legacy path and approach, only a subset of all available TSF information flows. For example, the TSF information handled in this example Legacy path and approach does not include ranges or any other data that can be used to determine an original focus location or the placement of text. Rather, when the Legacy application program 850 gets focus, the TipTSF.dll component 852 sends a focus event or notification data to a TSF manager object 854 (data transfer represented by arrow 856), but no range information is sent with the event data or notification 856. Therefore, there is no range information available to the TSF manager object 854 for use during a later data insertion step.

At some point in time after focus is originally established in the Legacy application program 850, a user may begin to write on an input area 812 of a text input panel (e.g., like text input panel windows 320 and 404 shown in FIGS. 3B and 4A, respectively, or like those available via a "Tabtip.exe" command in a Windows XP Tablet PC Edition™ operating system (available from Microsoft Corporation of Redmond, Wash.)) or otherwise insert input data into the computing system. When entry of this input begins, the input area 812 creates a new input object 858 in TCServer.exe 808 and triggers a notification to that input object 858 that user input has been initiated. This notification is represented by arrow 860 in FIG. 8. This notification 860 causes the input object 858 to bind to the TSF manager object 854 that is currently active. As noted above and as illustrated in FIG. 8, a TSF manager object 854, in at least some instances or at some times, may have multiple input objects 858 associated with it and/or bound to it.

When the input has been entered, the input in this example system and method is recognized, e.g., using conventional handwriting recognition technology as described above. Once recognized and available in machine-generated text form, the recognized text is sent first to the input object 858, as represented by arrow 862. From the input object 858, the recognized text then is sent to the bound TSF manager object 854 (represented by arrow 864). At this point, the TSF manager object 854 passes the recognized text to the TipTSF.dll component 852 (represented by arrow 866), which inputs the text into the application program 850 at the focus location. The data transfer 866 (or other appropriate trigger action) may "unbind" the TSF manager object 854 from the input object 858 and may close the input object 858.

The above explanation describes an example method in which Legacy application programs may receive input data when no focus change event has or is about to occur during the input of data in the input area 812, during its recognition, and/or during its insertion into the application program. Additional factors come into play, however, when focus change events have or are about to occur in the Legacy type application programs. Unlike the TSF-enabled path and approach described above, the instance of the TipTSF.dll component 852 in the Legacy application program 850 watches for events that might change focus, including, for example, mouse events, cursor insertion events, and focus events from the operating system. The TipTSF.dll component 852 watches these events by way of a system hook that gets a chance to see the events before the application program 850 itself actually sees and/or processes the events. If the TipTSF.dll component 852 sees an event that means that focus has and/or is changing (e.g., changing either to another part of the application program or to a different application program), it fires a notification to the associated TSF manager object 854 and waits for a response, as represented by arrow 868 in FIG. 8. In some more specific examples of systems and methods according to this invention, the TipTSF.dll component 852 will make a blocking COM call (or take other process blocking action) from an STA thread. This blocking COM call effectively prevents the application program 850 from doing almost anything else until the call is returned or responded to by the called object (i.e., TSF manager object 854 in this example).

In the associated TSF manager object 854, when the focus change notification 868 is received, the TSF manager object 854 determines if there was a bound input object 858. If there is a bound input object 858, and if that input object 858 has not yet sent recognized text to the TSF manager object 854, the TSF manager object 854 waits until the recognized text is sent from the input object 858 to the TSF manager object 854 (via data transfer arrow 864) before returning (or otherwise responding to) the process blocking call 868. This action, in effect, interrupts processing in the Legacy application program 850 until the TSF manager object 854 returns the process blocking call 868.

Once the recognized text moves from the input area 812 to the input object 858 (via arrow 862), then to the TSF manager object 854 (via arrow 864), and then to the application program (via arrow 866), the TSF manager object 854 then returns the process blocking call 868 to the TipTSF.dll component 852. The TipTSF.dll component 852 then returns control back to the application program 850, which inserts the recognized text from the input area 812 before allowing the focus change processing to be carried out.

In at least some examples of this invention, it is important as to what happens during the procedures at arrow 866. When the TipTSF.dll component 852 and/or the application program 850 sends the process blocking call (e.g., a blocking COM call), the program(s) generally and normally cannot take any further action at this time (e.g., the application program 850 can take no further action while the blocking call is out and it is waiting for a response to this blocking call from the TSF manager object 854). However, conventional COM calls will allow other COM calls to be processed, even during this waiting stage. Therefore, in accordance with at least some examples of this invention, the text insertion procedure, performed at arrow 866, may be accomplished using a COM call. Moreover, in this manner, the text insertion procedure may be performed at the application program 850, which still has focus at the desired location, while the remainder of processing in the application program 850, including the focus change processing, is interrupted.

In essence, the resulting effect is that when a focus change event occurs or is about to occur after ink/recognized text entry has started but before it is completed (as evidenced by the bound input object/TSF manager object combination), all processing in the application program is stopped temporarily until the recognized text is inserted. "All processing" in this context includes at least the processing of whatever focus-changing event was occurring after the input recognition/insertion process(es) started, but does not necessarily include processing other COM calls. These steps effectively allow the recognized text to be inserted in the Legacy application programs before the focus change occurs, and because the application program retains its original focus when the insertion occurs, these steps ensure that the recognized text arrives at the correct position in the application program.

3. Determining the Proper Path and/or Approach (e.g., Legacy or TSF-Enabled)

FIG. 8, as described above, illustrates example steps and/or components involved in systems and methods in accordance with the invention, depending on whether the input or the recognized information associated with the input is destined for a TSF-enabled application program or component or a non-TSF-enabled (or Legacy) application program or component. Some application programs, however, may contain both TSF-enabled components and non-TSF-enabled components. For example, a TSF-enabled application program may contain non-TSF-enabled components, such as third party or other controls or components that were not TSF-enabled and that cannot be TSF-enabled externally. Because different approaches or paths may be used depending on whether the input target or destination application program or component is TSF-enabled or not, systems and methods according to at least some examples of the invention may include the ability to determine which approach or path to follow for a particular data set input or insertion situation.

Figure 9:
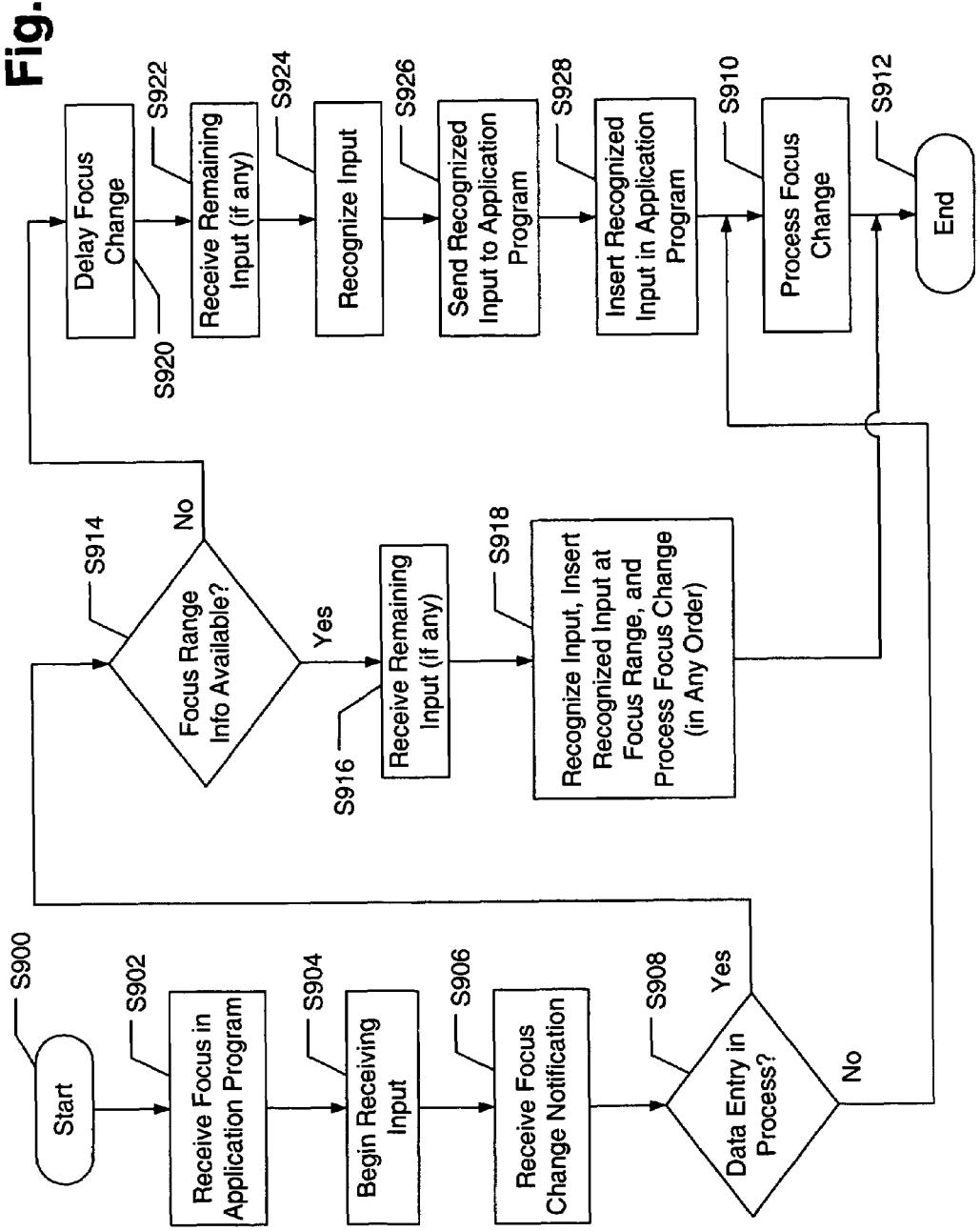
FIG. 9 illustrates examples of steps involved in accordance with at least some examples of the invention in determining whether to process input data as destined for a TSF-enabled application program or component or a non-TSF-enabled application program or component.

FIG. 9 provides a flow diagram that illustrates an example of steps that may be used in determining which approach or path to follow when a focus event is received in close temporal proximity to receipt of user input data. As suggested above from FIG. 8 and the descriptions of the TSF-enabled and Legacy paths and approaches, one difference between these two example paths or approaches involves the use and/or presence of focus range data. Therefore, the procedure described in conjunction with FIG. 9 takes advantage of this difference. Specifically, in this example procedure, when a process blocking call is received, if a TSF manager object sees cached range data associated with recognized input data and/or associated with a bound input object, then the TSF manager object will know that the input data is destined for a TSF-enabled application program or component. Therefore, the TSF manager object will not block processing in the application program when cached range data is available in this situation, and it will tell the TipTSF.dll component to insert the recognized input data at the cached range. If the TSF manager object does not see cached range data (e.g., with the bound input object) when a process blocking call is received, however, it will know that the input data is destined for a Legacy or non-TSF-enabled application program or component, and then the TSF manager object will wait to return the process blocking call (e.g., the blocking COM call described above) until all recognized text associated with incoming input is finished being inserted. In this manner, proper insertion of recognized input data to the proper ranges may take place in a purely TSF-enabled application program, a purely Legacy application program, and in an application program that contains both TSF-enabled and non-TSF-enabled components. The example procedure of FIG. 9 will be described in more detail below.

As the procedure starts (S900), an application program or even a specific component of an application program receives input focus (S902). This may occur in any desired manner, for example, by a user tapping a stylus to insert a cursor at a particular location, through a mouse click, through a user selection action, automatically via application program and/or operating system action, through inadvertence, opening a new application program, etc. After focus is received, a user eventually may open a text input panel window (e.g., like those described above in connection with FIGS. 3B and 4A) and/or otherwise direct ink or other input data to the range having input focus (S904).

At some point in time, an event that causes a focus change may be directed to the computer system (S906). Any desired action may induce this focus change without departing from the invention, such as user-initiated events (e.g., pen taps or mouse clicks in a new application program or in a new range within an application program, opening a new application program, etc.), operating system-initiated events (e.g., error messages, notifications, system messages, etc.), through inadvertence, or external initiated events (e.g., events generated by other application programs (e.g., email notifications, printing status notifications, etc.), events received over the internet, events initiated through a web browser, or the like). The change in focus notification (S906) may actually indicate that a change in focus has occurred, or it may indicate that a change in focus is about to occur. As described above in conjunction with FIG. 8, in at least some examples of this invention, an instance of a TipTSF.dll component in an application program may watch for events that might indicate a change in focus, including, for example, mouse events and focus events from the operating system. The TipTSF.dll component can watch these events by way of a system hook that gets a chance to see the events even before the application program itself actually sees the events. If the TipTSF.dll component sees an event that means that focus has and/or is changing (e.g., changing either to another part of the application program or to a different application program), it can fire a notification to the associated TSF manager object and wait, as described above. These actions may constitute the change in focus notification provided in S906 of FIG. 9.

When a notification is received (e.g., at a TSF manager object) that a focus change event has or is about to occur from S906, systems and methods according to this example of the invention next determine whether user input data entry was in process at the original focus location at the time the focus change notification was received (S908). This may be accomplished in at least some systems and methods according to this invention, for example, at the TSF manager object by determining if there is a bound input object associated with the TSF manager object. If there is a bound input object, this means that user input had started but had not been completed when the focus change notification event was received at the TSF manager object. If there is no bound input object, this means that any previously started user input had been completely entered into the application program at the time the focus change notification event was received at the TSF manager object, and therefore, no further action is needed at this time to insert the outstanding user input data.

If it is determined at S908 that no unrecognized and/or unentered user input data is present (answer "No"), the systems and methods according to this example of the invention then simply process the focus change (S910), and the process ends (S912) (e.g., waits for additional input, performs processes associated with the new focus location, etc.). If it is determined at S908 that data entry was in progress at the time the focus change notification was received (answer "Yes") (e.g., unrecognized and/or uninserted data is present), systems and methods according to this example of the invention then determine whether there is "range" information associated with the original focus data received at S902 (S914).

If range information is associated with the original focus data at S902 (answer "Yes" at S914), systems and methods according to this example of the invention then know the target or destination application program or component is TSF-enabled. The systems and methods then receive any remaining ink input (if any) (S916), and then they recognize the input, insert the recognized input at the focus range, and process the focus change in any order (S918), e.g., by the approach and path shown in the TSF-enabled approach and path of FIG. 8. Because range information is included and associated with the recognized text, there is no need to delay processing the focus change until after the recognized text is inserted. The procedure then ends (S912) (e.g., waits for additional input, performs processes associated with the new focus location, etc.).

If range information is not associated with the original focus data at S902 (answer "No" at S914), systems and methods according to this example of the invention then know the target or destination application program or component is not TSF-enabled. Processing in this non-TSF-enabled situation may follow the Legacy approach and path described above in conjunction with FIG. 8. For example, the systems and methods according to at least some examples of the invention then may delay processing of the focus change (S920), e.g., by not yet responding to a process blocking call, such as a blocking COM call, used to notify of the focus change at S906. The systems and methods then may receive any remaining ink input (if any) (S922), recognize the input (S924), and send the recognized input to the application program or component (S926). Because processing previously was delayed in the application program at S920, the application program still retains focus at the desired focus range. As described above, in at least some examples of the invention, the recognized input may be sent to the application program via a COM call, because application programs typically can process other COM calls, even when an earlier COM call remains outstanding and awaiting a reply. Once all input is received, recognized, and sent to the application program or component, the system and method according to this example of the invention can resume processing, e.g., by allowing the TSF manager object to respond to the blocking COM call. Once the process block or delay is lifted (e.g., the blocking COM call is returned), the application program will have the recognized text available to insert at the focus range, it will insert this text (S928), and then the system and method will process the focus change (S910). The procedure then ends (S912) (e.g., waits for additional input, performs processes associated with the new focus location, etc.).

Those skilled in the art will understand that the description above in connection with FIGS. 8 and 9 are merely examples of processing that may take place and components that may be used in accordance with some examples of this invention. Those skilled in the art will appreciate that the various process steps, process conditions, stored information, and the like may vary widely without departing from the invention. For example, specific process steps described above may be omitted, changed, changed in order, and the like, and additional steps may be added, etc., without departing from the invention. Also, additional steps may be included between the various process steps described above, and/or long time periods may elapse between the various described steps without departing from aspects of this invention. Additionally, if desired, the component structure or architecture may differ from that shown in FIGS. 8 and 9. As a more specific example, if desired, the input object(s) and/or TSF manager object(s), shown in FIG. 8 as part of TCServer.exe, may reside in other portions of the structure or architecture without departing from the invention, such as in Tabtip.exe, or at any other appropriate or desired location. Other architectural and/or structural changes also may be made without departing from this invention.

C. Additional Features Relating to Examples and Aspects of the Invention

Aspects of the invention also relate to systems for performing the various methods and running the various programs or components described above. Such systems may include one or more input devices for receiving user input, such as the various example input devices described above in connection with FIGS. 1 through 9. Additionally, a processing system (e.g., including one or more processors, CPUs, and/or associated devices, or the like) may be used to perform the various method steps described above.

Also, as noted above, aspects of the invention advantageously may be used for processing electronic ink input, speech input, or other input in which there is a delay between the initial data entry and its insertion to a desired location or range in the application program (e.g., input that must be recognized, converted to some other format, translated, and/or otherwise processed before its insertion).

Aspects of the invention also may be used for processing other input, e.g., input that goes directly to the application program without recognition, conversion, translation, or the like, such as keyboard input. For example, as described above in connection with FIGS. 7A through 7E, while inputting data via a keyboard, a focus change may occur, and it may be processed between keystrokes (e.g., a system-generated focus change, an externally-generated focus change, an inadvertent focus change (e.g., by a user dragging his/her thumb across a touchpad, etc.), or the like). As one more specific example, systems and methods according to at least some examples of the invention may measure the time between keystrokes. If the system or method determines that the user's keyboard input rate immediately after the focus change was within a predetermined range of the keyboard input rate immediately before the focus change, and if the system or method determines that the user continuously entered input through the focus change, it may then determine that the user intended the keyboard input to continue to the first, original focus location, despite the change in focus. Therefore, the input still may be sent to the original focus location and the focus change then processed. Of course, other factors may be taken into consideration in determining whether to send the input to the original focus range (e.g., whether there was any delay in input or other change in input characteristics immediately after the focus change, etc.).

Finally, the present invention also relates to computer-readable media including computer-executable instructions stored thereon for processing user input received at or near the time of a focus change event, for performing various methods, and/or for use in various systems, including the systems and/or methods described above. The computer-readable media may constitute computer-executable instructions stored on the various specific examples of computer-readable media described above.

V. Conclusion

Various examples of the present invention have been described above, and it will be understood by those of ordinary skill that the present invention includes within its scope all combinations and subcombinations of these examples. Additionally, those skilled in the art will recognize that the above examples simply exemplify various aspects of the invention. The various specific steps and/or architectural elements described above can be changed, functions may be added, deleted, combined, and/or changed in order without departing from the invention. Thus, various changes and modifications may be made without departing from the spirit and scope of the invention, as defined in the appended claims.

The invention claimed is:

1. A method, comprising:
    receiving data indicating that an application program has obtained focus; determining when a focus change has occurred or is about to occur;
    when a determination is made that a focus change has occurred or is about to occur, performing interrupting processing including halting processing in the application program and postponing the focus change; and
    while processing in the application program is halted, determining if at least some user input data has been input that has not been entered as insert-data into the application program, wherein when at least some user input data not entered as insert-data into the application program is present, the method further includes: (a) continuing to halt processing in the application program until the user input data has been input and all of the insert-data corresponding to the user input data is available to be entered, (b) then sending and entering the user input data as the insert-data into the application program, and (c) then resuming processing in the application program and processing of the focus change.

2. A method according to claim 1, wherein when it is determined that there is no user input data not entered as insert-data into the application program, the processing interruption is discontinued, and the method further includes processing the focus change.

3. A method according to claim 1, wherein the focus change changes focus from a first range in the application program to a second range in the application program.

4. A method according to claim 1, wherein the focus change changes focus from a first range in the application program to a different application program.

5. A method according to claim 1, wherein the input data includes keystroke data.

6. A method according to claim 1, wherein the input data includes electronic ink data.

7. A method according to claim 1, wherein the input data includes speech data.

8. A computer-readable medium including computer executable instructions stored thereon for performing the method of claim 1.

9. A method, comprising:
    notifying a manager object that an application program has obtained focus; determining when a focus change has occurred or is about to occur;
    when a determination is made that a focus change has occurred or is about to occur, sending a process blocking call from the application program to the manager object to halt processing in the application program; and
    when the process blocking call is received at the manager object, determining if an input object is associated with the manager object, wherein when it is determined that an input object is associated with the manager object, the manager object waits to receive data corresponding to recognized text from the input object, then sends the data corresponding to the recognized text to the application program, and then returns or responds to the process blocking call thereby allowing processing in the application program to resume, and wherein when it is determined that no input object is associated with the manager object, the manager object returns or responds to the process blocking call thereby allowing processing in the application program to resume.

10. A method according to claim 9, further comprising: receiving input data;
    creating the input object when input data is initially received; and associating the input object with the manager object.

11. A method according to claim 10, further comprising:
    recognizing the input data to thereby provide data corresponding to recognized text associated with the input data;
    sending data corresponding to the recognized text to the input object; and
    sending data corresponding to the recognized text from the input object to the manager object.

12. A method according to claim 11, wherein the determination that a focus change has occurred or is about to occur takes place after the input object is created but before the input data is fully recognized, wherein the focus change does not affect where the data corresponding to the recognized text is inserted.

13. A method according to claim 11, wherein the determination that a focus change has occurred or is about to occur takes place after receipt of the input data has started but before the data corresponding to the recognized text is inserted in the application program, wherein the focus change does not affect where the data corresponding to the recognized text is inserted.

14. A method according to claim 9, wherein the application program is a nonTSF-enabled application program.

15. A method according to claim 9, wherein the focus change changes focus from a first range in the application program to a second range in the application program.

16. A method according to claim 9, wherein the focus change changes focus from the application program to a different application program.

17. A method according to claim 9, wherein the input data includes electronic ink data.

18. A method according to claim 9, wherein the input data includes speech data.

19. A computer-readable medium including computer executable instructions stored thereon for performing the method of claim 9.

20. A method, comprising: notifying a TSF manager object that an application program has obtained focus; determining when a focus change has occurred or is about to occur;
   when a determination is made that a focus change has occurred or is about to occur, sending a blocking COM call from the application program to the TSF manager object to halt processing in the application program; and
   when the blocking COM call is received at the TSF manager object, determining if an ink input object is associated with the TSP manager object, wherein when it is determined that an ink input object is associated with the TSF manager object, the TSP manager object waits to receive data corresponding to recognized text from the ink input object, then sends the data corresponding to the recognized text to the application program, and then returns or responds to the blocking COM call to resume processing in the application program, and wherein when it is determined that no ink input object is associated with the TSF manager object, the TSP manager object returns or responds to the blocking COM call to resume processing in the application program.

21. A method according to claim 20, further comprising:
receiving ink input data in an ink input area;
   creating the ink input object to receive the ink input data; and associating the ink input object with the TSF manager object.

22. A method according to claim 21, wherein the ink input object is created when receipt of ink input data is initially detected.

23. A method according to claim 22, further comprising:
   recognizing the ink input data to thereby provide data corresponding to the recognized text associated with the ink input data;
   sending data corresponding to the recognized text to the ink input object; and sending data corresponding to the recognized text from the ink input object to the TSF manager object.

24. A method according to claim 23, wherein the determination that a focus change has occurred or is about to occur takes place after the ink input object is created but before the ink input data is fully recognized, wherein the focus change does not affect where the data corresponding to the recognized text is inserted.

25. A method according to claim 23, wherein the determination that a focus change has occurred or is about to occur takes place after receipt of the ink input data has started but before the data corresponding to the recognized text is inserted in the application program, wherein the focus change does not affect where the data corresponding to the recognized text is inserted.

26. A method according to claim 20, wherein the application program is a nonTSF-enabled application program.

27. A method according to claim 20, wherein the focus change changes focus from a first range in the application program to a second range in the application program.

28. A method according to claim 20, wherein the focus change changes focus from the application program to a different application program.

29. A method according to claim 20, wherein the TSF manager object is notified that the application program has obtained focus by a tiptsf.dll component.

30. A method according to claim 29, wherein the TSP manager object sends the data corresponding to the recognized text to the application program via the tiptsf.dll component.

31. A computer-readable medium including computer executable instructions stored thereon for performing the method of claim 20.

32. A system, comprising:
   an input system for receiving input data; and
   a processor system programmed and adapted to: (a) receive data indicating that an application program has obtained focus; (b) determine when a focus change has occurred or is about to occur; (c) when a determination is made that a focus change has occurred or is about to occur, performing interrupt processing including halting processing in the application program and postponing the focus change; and (d) while processing in the application program is halted, determine if at least some user input data has been input that has not been entered as insert-data into the application program, wherein when at least some user input data not entered as insert-data into the application program is present: (i) continue halting processing in the application program until the user input data has been input and all of the insert-data corresponding to the user input data is available to be entered, (ii) then sending and entering the user input data as the insert-data into the application program, and (iii) then resuming processing in the application program and processing of the focus change.

33. A system according to claim 32, wherein when it is determined that there is no user input data not entered as insert-data into the application program, the processor system is further programmed and adapted to discontinue the processing interruption and process the focus change.

34. A system according to claim 32, wherein the focus change changes focus from a first range in the application program to a second range in the application program.

35. A system according to claim 32, wherein the focus change changes focus from a first range in the application program to a different application program.

36. A system according to claim 32, wherein the input data includes keystroke data.

37. A system according to claim 32, wherein the input data includes electronic ink data.

38. A system according to claim 32, wherein the input data includes speech data.

39. A system, comprising:
   an input system for receiving input data; and
   a processor system programmed and adapted to: (a) notify a manager object that an application program has obtained focus; (b) determine when a focus change has occurred or is about to occur; (c) when a determination is made that a focus change has occurred or is about to occur, send a process blocking call from the application program to the manager object to halt processing in the application program; and (d) when the process blocking call is received at the manager object, determine if an input object is associated with the manager object, wherein when it is determined that an input object is associated with the manager object, the manager object waits to receive data corresponding to recognized text from the input object, then sends the data corresponding to the recognized text to the application program, and then returns or responds to the process blocking call thereby allowing processing in the application program to resume, and wherein when it is determined that no input object is associated with the manager object, the manager object returns or responds to the process blocking call thereby allowing processing in the application program to resume.

40. A system according to claim 39, wherein the processor system further is programmed and adapted to create the input object when input data is initially received and associate the input object with the manager object.

41. A system according to claim 40, wherein the processor system further is programmed and adapted to: recognize the input data to thereby provide data corresponding to recognized text associated with the input data; send data corresponding to the recognized text to the input object; and send data corresponding to the recognized text from the input object to the manager object.

42. A system according to claim 41, wherein when the determination that a focus change has occurred or is about to occur takes place after the input object is created but before the input data is fully recognized, the processor system is programmed and adapted such that the focus change does not affect where the data corresponding to the recognized text is inserted.

43. A system according to claim 41, wherein when the determination that a focus change has occurred or is about to occur takes place after receipt of the input data has started but before the data corresponding to the recognized text is inserted in the
application program, the processor system is programmed and adapted such that the focus change does not affect where the data corresponding to the recognized text is inserted.

44. A system according to claim 39, wherein the application program is a nonTSF-enabled application program.

45. A system according to claim 39, wherein the focus change changes focus from a first range in the application program to a second range in the application program.

46. A system according to claim 39, wherein the focus change changes focus from the application program to a different application program.

47. A system according to claim 39, wherein the input data includes electronic ink data.

48. A system according to claim 39, wherein the input data includes speech data.

49. A system, comprising:
an input system for receiving ink input data from an ink input area; and
a processor system programmed and adapted to: (a) notify a TSF manager object that an application program has obtained focus; (b) determine when a focus change has occurred or is about to occur; (c) when a determination is made that a focus change has occurred or is about to occur, send a blocking COM call from the application program to the TSF manager object to halt processing in the application program; and (d) when the blocking COM call is received at the TSF manager object, determine if an ink input object is associated with the TSF manager object, wherein when it is determined that an ink input object is associated with the TSF manager object, the TSF manager object waits to receive data corresponding to recognized text from the ink input object, then sends the data corresponding to the recognized text to the application program, and then returns or responds to the blocking COM call to resume processing in the application program, and wherein when it is determined that no ink input object is associated with the TSF manager object, the TSF manager object returns or responds to the blocking COM call to resume processing in the application program.

50. A system according to claim 49, wherein the processor system further is programmed and adapted to create the ink input object to receive the ink input data and associate the ink input object with the TSP manager object.

51. A system according to claim 50, wherein the ink input object is created when receipt of ink input data is initially detected.

52. A system according to claim 51, wherein the processor system further is programmed and adapted to: recognize the ink input data to thereby provide data corresponding to the recognized text associated with the ink input data; send data corresponding to the recognized text to the ink input object; and send data corresponding to the recognized text from the ink input object to the TSF manager object.

53. A system according to claim 52, wherein when the determination that a focus change has occurred or is about to occur takes place after the ink input object is created but before the ink input data is fully recognized, the processor system further is programmed and adapted such that the focus change does not affect where the data corresponding to the recognized text is inserted.

54. A system according to claim 52, wherein when the determination that a focus change has occurred or is about to occur takes place after receipt of the ink input data has started but before the data corresponding to the recognized text is inserted in the application program, the processor system further is programmed and adapted such that the focus change does not affect where the data corresponding to the recognized text is inserted.

55. A system according to claim 49, wherein the application program is a nonTSF-enabled application program.

56. A system according to claim 49, wherein the focus change changes focus from a first range in the application program to a second range in the application program.

57. A system according to claim 49, wherein the focus change changes focus from the application program to a different application program.

58. A system according to claim 49, wherein the processor system further is programmed and adapted such that the TSF manager object is notified that the application program has obtained focus by a tiptsf.dll component.

59. A system according to claim 58, wherein the processor system further is programmed and adapted such that the TSP manager object sends the data corresponding to the recognized text to the application program via the tiptsf.dll component.

* * * * *

UNITED STATES PATENT AND TRADEMARK OFFICE
CERTIFICATE OF CORRECTION

PATENT NO. : 7,634,738 B2
APPLICATION NO. : 10/992092
DATED : December 15, 2009
INVENTOR(S) : Clow et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 936 days.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,634,738 B2 | Page 1 of 1 |
| APPLICATION NO. | : 10/992092 | |
| DATED | : December 15, 2009 | |
| INVENTOR(S) | : Josh A. Clow et al. | |

It is certified that error appears in the above-identified patent and that said Letters Patent is hereby corrected as shown below:

In column 31, line 29, in Claim 20, delete "TSP" and insert -- TSF --, therefor.

In column 31, line 31, in Claim 20, delete "TSP" and insert -- TSF --, therefor.

In column 31, line 38, in Claim 20, delete "TSP" and insert -- TSF --, therefor.

In column 32, line 15, in Claim 30, delete "TSP" and insert -- TSF --, therefor.

In column 34, line 21, in Claim 50, delete "TSP" and insert -- TSF --, therefor.

In column 34, line 60, in Claim 59, delete "TSP" and insert -- TSF --, therefor.

Signed and Sealed this
Tenth Day of May, 2011

David J. Kappos
*Director of the United States Patent and Trademark Office*